United States Patent [19]
Fujiwara et al.

[11] Patent Number: 5,777,977
[45] Date of Patent: Jul. 7, 1998

[54] RECORDING AND REPRODUCING APPARATUS

[75] Inventors: Ichiro Fujiwara; Akio Machida; Shigeru Kojima, all of Kanagawa, Japan

[73] Assignee: Sony Corporation, Tokyo, Japan

[21] Appl. No.: 701,687

[22] Filed: Aug. 22, 1996

[51] Int. Cl.$^6$ .................................................. G11B 7/00
[52] U.S. Cl. .................................................. 369/126; 369/47
[58] Field of Search ................................. 369/126, 54, 58, 369/59, 47, 48, 124, 32; 250/306, 307

[56] References Cited

U.S. PATENT DOCUMENTS 5,323,375  6/1994  Ihara et al. .................. 369/126 X
5,439,777  8/1995  Kawada et al. ............... 369/126 X

*Primary Examiner*—Muhammad N. Edun
*Attorney, Agent, or Firm*—Hill, Steadman & Simpson

[57] ABSTRACT

A recording and reproducing apparatus has a recording and/or reading head having a tip for recording and/or reproducing information on and/or from a recording medium. Information is recorded and/or erased by way of a polarization reversal or transport of electric charges in a predetermined area of the recording medium in response to application of a pulse voltage from the head. The information recorded in the predetermined area is detected as a change in the electric charges or an electrostatic capacitance or a surface potential or their differential in the predetermined area for reproducing the information.

26 Claims, 13 Drawing Sheets

F I G. 15
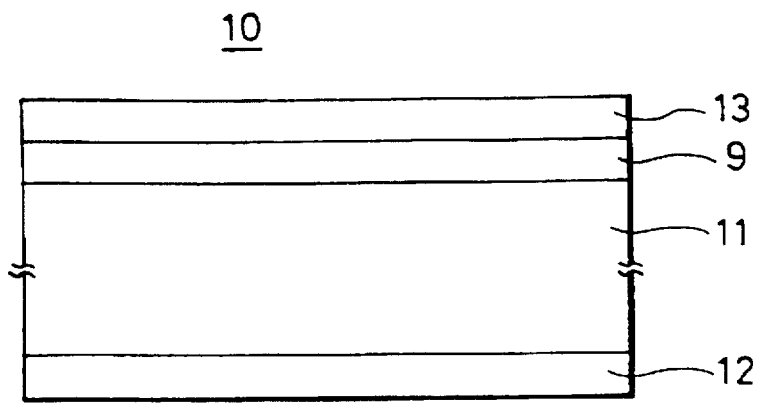
F I G. 16
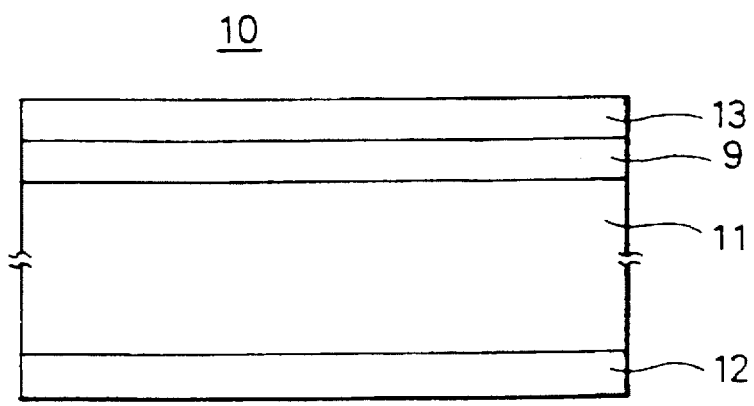
F I G. 17
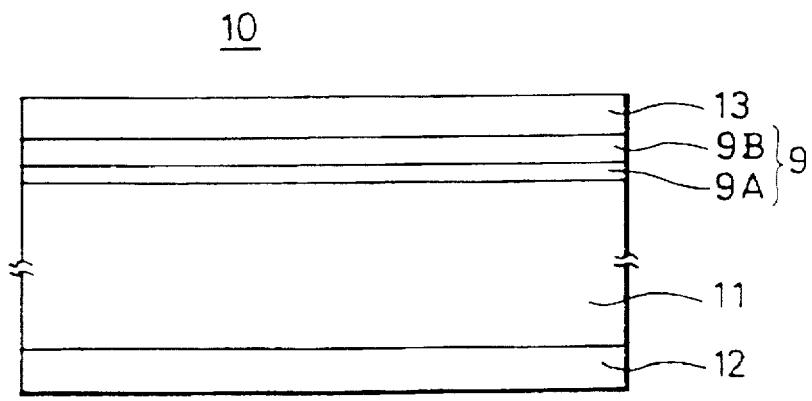

RECORDING AND REPRODUCING APPARATUS

BACKGROUND OF THE INVENTION

1. Field of the Invention

The present invention relates to a recording and reproducing apparatus for recording and reproducing, or reproducing, highly packed information such as image information, large amounts of data, etc.

2. Description of the Prior Art

Multimedia systems including high-definition television systems, sophisticated information communication systems, computer networks, video-on-demand systems, information-on-demand systems, etc. are required to handle large amounts of image information, data files, etc. There have been growing demands in the art for recording and reproducing apparatus for recording and reproducing such large amounts of image information, data files, etc. at high speeds in connection with such multimedia systems.

Conventional random-access storage technologies for recording highly packed information include magnetic recording, optical recording, semiconductor memories, etc.

Semiconductor memories are experiencing greater scales of integration every year. However, because of limitations imposed by fabrication techniques, for example, photolithography, for semiconductor memories, it has not yet been able to produce semiconductor memories having a storage capacity capable of recording image information of high definition, i.e., at least 3 gigabytes of information.

For recording a large amount of information by way of optical recording or magnetic recording, it is necessary to reduce a recording area to increase the recording density of the information.

Attempts have been made to reduce a recording area for optical recording. Even when a semiconductor laser source having a wavelength of about 500 nm is used as a light source for optical recording, however, it is considered to be difficult to achieve a recording area (recording bit) having a diameter of 100 nm or less due to physical limitations and light diffraction limits.

Magnetorestrictive magnetic heads (MR magnetic heads) and giant magnetorestrictive magnetic heads (GMR magnetic heads) have been developed for use with hard disks to increase the recording density for magnetic recording. However, it is difficult to achieve a recording area having a diameter of 100 nm or less on account of the sensitivity of reproducing heads.

There have been developed a scanning tunneling microscope (STM) and an atomic force microscope (AFM) which have a spatial resolution as small as atoms and molecules. These microscopes have been used for the analysis of microscopic surface configurations of various materials, and proven successful as surface analyzers.

The AFM employs an atomic interaction between a specimen and a cantilever tip as a probe. The AFM has recently been developed as a scanning probe microscope (SPM) which employs any of various physical quantities as a probe. Recent years have seen efforts to review the practicability of a high-density memory using those microscopes, i.e., means for accessing atoms and molecules.

Attempts to achieve high-density recording using an STM or AFM have been reported. However, the reports have described only principled possibilities, and have not proposed any practical device of high-density recording using an STM or AFM.

For example, Mr. Quate, et al. of Stanford University have indicated the possibility of an application of a scanning capacitance microscope (SCM), which is a developed version of AFM, to a high-density memory, using a recording medium of an NOS ($SiN/SiO_2/Si$) structure which comprises an $SiO_2$ film and an SiN film that are disposed on an Si substrate (see R. C. Barret and C. F. Quate: Journal of Applied Physics, 70 2725–2733 (1991)).

As shown in FIG. 1 of the accompanying drawings, an MNOS (Metal Nitride Oxide Semiconductor) recording medium comprises an $Sio_2$ film 2 deposited on an n-type Si substrate 1 by thermal oxidation, an SiN film 3 deposited on the $SiO_2$ film 2 by thermal chemical vapor deposition (CVD), and a metal electrode 4 deposited on the SiN film 3. The MNOS recording medium has already been used in an EEPROM (Electrically Erasable Read-Only Memory) which is one of non-volatile semiconductor memories.

The principles of recording and reproducing information with NOS and MNOS recording mediums are based on the transport of electric charges between an Si semiconductor and an $SiO_2/SiN$ interface or a nearby trap in SiN.

Specifically, it is known that a carrier trap is developed in an $SiO_2/SiN$ interface and an SiN layer which makes up the interface (hereinafter referred to as near the $SiO_2/SiN$ interface) in the laminar structure. If a positive voltage is applied to the metal electrode 4 (hereinafter referred to as an upper electrode) on the SiN film 3 in the MNOS recording medium shown in FIG. 1, then electrons from the Si substrate 1 tunnel through the $SiO_2$ film 2 under the intensive electric field, and are introduced into and stored in a trap near the $SiO_2/SiN$ interface. If a negative voltage is applied to the upper electrode 4, then the electrons stored in the trap tunnel through the $SiO_2$ film 2 toward the Si substrate 1 under the inverse intensive electric field, with the result that the trap near the $SiO_2/SiN$ interface is depleted of electrons. In this manner, electric charges are moved in response to the application of electric pulses to the MNOS recording medium, recording and erasing information. For reading or reproducing recorded information from the recording medium, a change in the electrostatic capacitance of the recording medium, i.e., an MNOS capacitor, is electrically read.

According to the research efforts made by Mr. Quate, et al., information is recorded in or erased from the NOS medium while a conductive cantilever is being held in contact with the NOS medium, and a change in the capacitance based on the recorded information while the conductive cantilever is being held in contact with the NOS medium is detected by a capacitance sensor to reproduce the recorded information. The research paper has indicated that this process makes it possible to record and reproduce information in a minute area, i.e., to carry out high-density recording, which cannot be achieved by the optical or magnetic recording process that is currently used or subject to research and development projects. The transport of a carrier (electrons) is employed in the recording medium for recording and erasing, and reproducing, information. According to an experiment, a minimum recording area was about 150 nm across, and electrons stored in a trap was stable for at least 7 days.

However, the above high-density recording principles suffer the following drawbacks:

(1) For reproducing recorded information, i.e., reading a change in the capacitance, the cantilever which is coated with metal is held in contact with the recording medium. Since the cantilever, i.e., the head, suffers large friction and wear due to the contact with the recording medium, the head is deteriorated soon, and as a result, the recording and reproducing characteristics are degraded.

(2) The materials of the NOS structure require a time of 5 milliseconds and a voltage of 40 V (threshold voltage of 25 V) to record and erase information. Therefore, the NOS recording medium does not meet requirements for high-speed, low-voltage operation.

(3) When electric charges are stored in the $SiO_2/SiN$ interface, the stored electric charges induce a depletion layer on side of the Si substrate, which tends to increase the capacitance. When recorded information is reproduced by detecting the increased capacitance, the effective size of a recording area is increased.

(4) Recorded information is reproduced by reading a change in the capacitance of the recording medium directly with a capacitor sensor disposed immediately behind the cantilever. The capacitor sensor is extremely sensitive to a surface topography of the recording medium. Since a stray capacitance may possibly increase in some cases, the signal-to-noise ratio of the capacitor sensor is liable to be lowered.

Conventional storage mediums from which recorded information can be reproduced based on a detected change in capacitance include an electrostatic capacitance (CED) recording medium and a VHD video disk in which highly packed information can be stored. These storage mediums, however, have a recording density which is too low for using them as storage mediums for storing large amounts of information. The storage mediums are used only for reproducing stored information therefrom, and have no function to record or erase information.

SUMMARY OF THE INVENTION

It is therefore an object of the present invention to provide a recording and reproducing apparatus which will solve the above problems based on a combination of an SPM, a ferroelectric material medium, a charge-storage material medium, and a carrier-transportable molecular material medium, which can record information at a high speed with a high density, and which can increase the service life of a head.

According to the present invention, there is provided a recording and reproducing apparatus for recording and/or reproducing information with a head having a tip, comprising means for recording and/or erasing information by way of a polarization reversal or transport of electric charges in a predetermined area of a recording medium in response to application of a pulse voltage from the head, and means for detecting the information recorded in the predetermined area as a change in the amount of electric charges or an electrostatic capacitance or a surface potential or their differential in the predetermined area for thereby reproducing the information without contacting the recording medium.

More specifically, a voltage is applied from the head to record or erase information by way of a polarization reversal or transport of electric charges in a predetermined area of the recording medium. The information recorded in the predetermined area is reproduced as a change in the amount of electric charges or the electrostatic capacitance or the surface potential in the predetermined area or a differential thereof, by the head while it is being held out of contact with the recording medium.

Since the pulse voltage is applied from the tip to the recording medium to record or erase information by way of the polarization reversal or transport of the electric charges, the information can be recorded at a high speed in a high density. Because the recorded information is reproduced as a change in the electric charges or the electrostatic capacitance or the surface potential in the predetermined area or a differential thereof, by the tip while it is being held out of contact with the recording medium, the tip and the recording medium are prevented from being worn when the recorded information is reproduced.

BRIEF DESCRIPTION OF THE DRAWINGS

FIG. 15 is a fragmentary cross-sectional view of a recording medium according to a further example of the present invention;

FIG. 16 is a fragmentary cross-sectional view of a recording medium according to a still further example of the present invention;

FIG. 17 is a fragmentary cross-sectional view of a recording medium according to a yet still further example of the present invention;

DETAILED DESCRIPTION OF THE PREFERRED EMBODIMENTS

Figure 1:
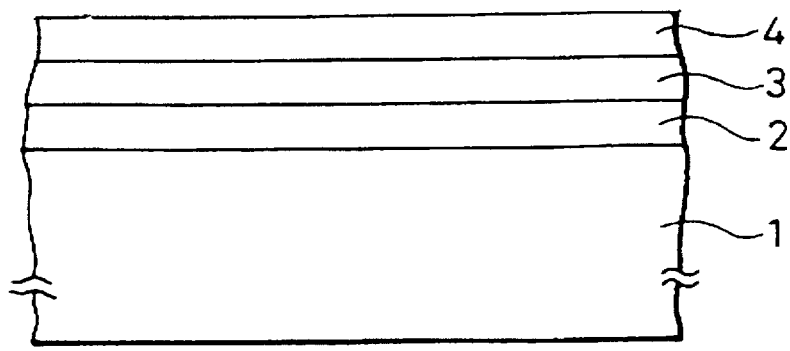
FIG. 1 is a fragmentary cross-sectional view of a conventional recording medium.

Like or corresponding parts are denoted by like or corresponding reference numerals throughout views.

Figure 2:
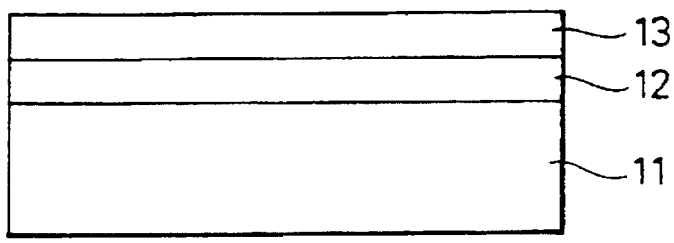
FIG. 2 is a fragmentary cross-sectional view of a recording medium according to the present invention.
Figure 3:
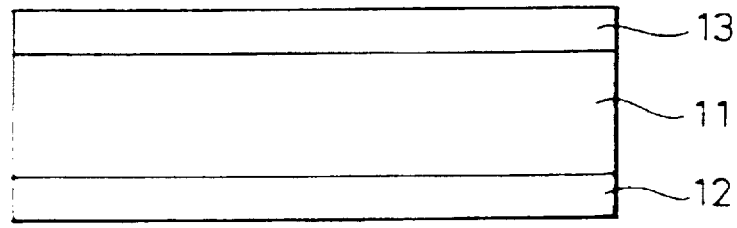
FIG. 3 is a fragmentary cross-sectional view of another recording medium according to the present invention.

FIGS. 2 and 3 fragmentarily show recording mediums 10 according to the present invention in cross section. The recording medium 10 shown in FIG. 2 comprises a substrate 11, a lower electrode 12 disposed on an upper surface of the substrate 11, and an active layer 13 disposed on an upper surface of the lower electrode 12 for recording information therein. The recording medium 10 shown in FIG. 3 comprises a substrate 11, a lower electrode 12 disposed on a lower surface of the substrate 11, and an active layer 13 disposed on an upper surface of the substrate 11 remotely from the lower electrode 12 for recording information therein.

The active layer 13 comprises a ferroelectric layer which is subject to local polarization reversal, or a charge-storage layer for introducing or discharging a carrier (electrons or holes), i.e., moving electric charges.

The ferroelectric layer or the charge-storage layer of each of the recording mediums 10 may be deposited by sputtering, MOVCD (Metal Organic Chemical Vapor Deposition), LPCVD (Low-Pressure CVD), molecular beam vapor deposition, ordinary vapor deposition, MOD (Metal Oxide Deposition), laser ablation, sol-gel deposition, spin coating, thermal oxidation, or thermal nitridation.

Recording, erasing, and reproducing apparatus according to the present invention will be described below.

Recording, erasing apparatus

Figure 4:
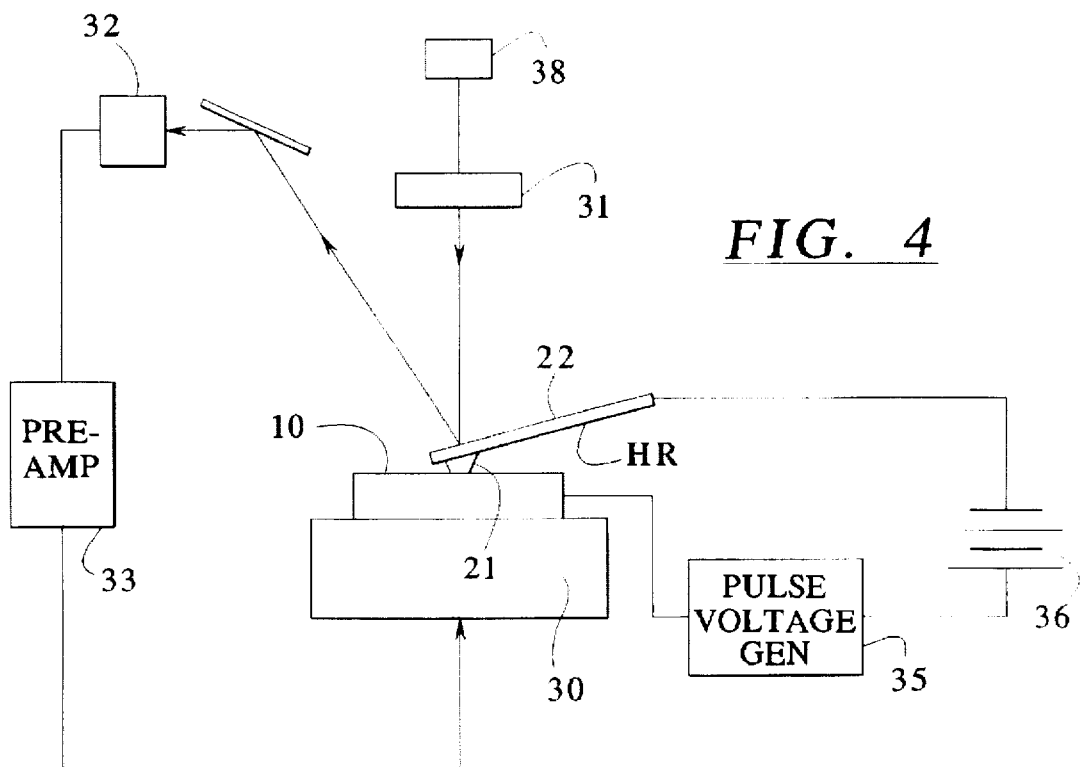
FIG. 4 is a block diagram of an information recording apparatus according to the present invention.

FIG. 4 shows in block form a recording apparatus according to the present invention. The recording apparatus has a recording head HR comprising a cantilever 22 with one end fixed in position. The cantilever 22 comprises a strip-shaped leaf spring which has a tip 21 disposed on a distal end thereof and having a conical shape, a triangular pyramidal shape, or a columnar shape having a triangular cross section, for example, for contacting a recording medium 10 in point contact or ultra-small surface area contact therewith. The cantilever 22 is made of Si or SiN having a spring constant ranging from 0.01 to 10 (N/m), and covered with a single- or multi-layer surface coating of Au, Pt, Co, Ni, Ir, Cr, or the like for high electric conductivity. Alternatively, the cantilever 22 is made of conductive silicon doped with a conductive impurity and machinable into a tip. The cantilever 22 can be produced by the so-called microfabrication technology.

The recording medium 30 is placed on a support base 10 which is rotatable or movable along x- and y-axes extending perpendicularly to each other along the horizontal plane of the support base 30. The support base 30 is also movable along a z-axis in a vertical direction perpendicular to the horizontal plane of the support base 10 for adjusting the condition in which the tip 21 or the recording head HR, i.e., the cantilever 22, contacts the recording medium 10.

Movement of the support base 30 along the z-axis is controlled as follows: A laser beam emitted from a semiconductor laser 38 is focused onto the distal end of the cantilever 22 by a focusing lens system 31, and a laser beam reflected by the distal end of the cantilever 22 is differentially detected by a photodetector 32 comprising a plurality of segmental photodiodes, e.g., four segmental photodiodes. A detected signal from the photodetector 32 is supplied through an amplifier 33 to a servo circuit 34, which controls the position of the support base 30 along the z-axis to keep the recording head HR, i.e., the cantilever 22 in optimum contact with the recording medium 10 at all times.

A voltage depending on a recording signal is applied between the cantilever 22 and the lower electrode 12 of the recording medium 10. The applied voltage is produced by adding a pulse voltage which is generated by a pulse voltage generator 35 depending on the recording signal, to a predetermined DC bias voltage produced by a DC power supply 36.

When the voltage is thus applied, desired information, which is represented by the pulse voltage, can be recorded on the recording medium 10 by the tip 21 while the tip 21 is being held in contact with the recording medium 10 and moved relatively to the recording medium 10.

Reproducing apparatus

Recorded information is read or reproduced from the recording medium 10 while a reading head is held out of contact with the recording medium 10. A reproducing apparatus for reproducing recorded information from the recording medium 10 may be of one of the following three configurations:

(i) Scanning Maxwell stress microscope (SMM) configuration;

(ii) Heterodyne detected system with the SMM configuration; and (iii) Kelvin force microscope (KFM) configuration.

The above three configurations (i), (ii), (iii) will be described below.

(i) SMM configuration

Figure 5:
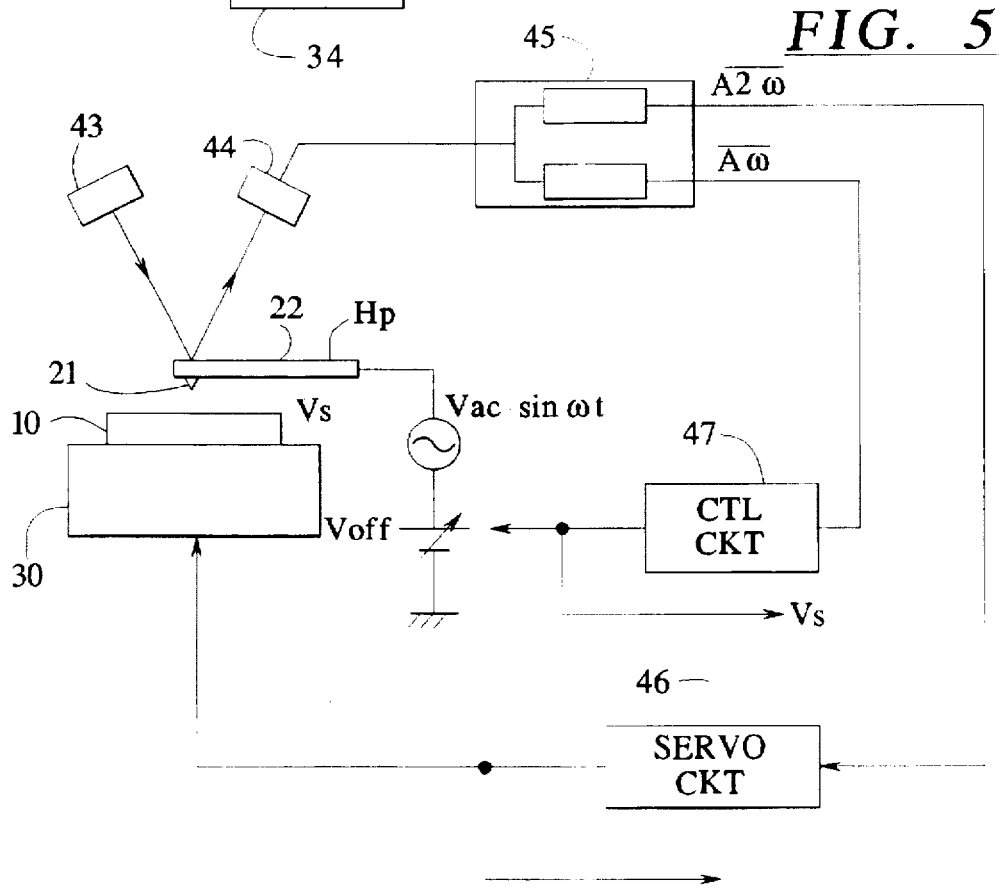
FIG. 5 is a block diagram of an information reproducing apparatus according to the present invention.

FIG. 5 shows a reading head HP and a control system of an information reproducing apparatus of the SMM configuration.

The information reproducing apparatus shown in FIG. 5 reproduces recorded information from a recording medium 10 based on the known principles of operation of SMM (see, for example, Molecular Electronics and Bioelectronics, Vol. 3, p. 79 (1992)).

The reading head HP, which may be identical to the recording head HR shown in FIG. 4, is kept out of contact with the recording medium 10. The reading head HP comprises a cantilever 22 with one end fixed in position. The cantilever 22 comprises a strip-shaped leaf spring which has a tip 21 disposed on a distal end thereof and having a conical shape, a triangular pyramidal shape, or a columnar shape having a triangular cross section, for example. The cantilever 22, which is held out of contact with the recording medium 10 which is supported on a support base 30, detects a surface potential Vs or an electrostatic capacitance of the recording medium 10 to reproduce recorded information from the recording medium 10.

The support base 30 is rotatable or movable along x- and y-axes extending perpendicularly to each other along the horizontal plane of the support base 30. The support base 30 is also movable along a z-axis in a vertical direction perpendicular to the horizontal plane of the support base 30 for adjusting the gap between the support base 30 and the tip 21.

When a bias voltage V is applied between the reading head HP or the cantilever 22 and the recording medium 10, a force Fz expressed by the equation (1), given below, acts between the tip 21 and the recording medium 10 due to an electrostatic coupling.

$$F_Z = -\frac{1}{2}\left(\frac{\partial C}{\partial Z}\right)V^2 \quad (1)$$

where C represents the electrostatic capacitance between the tip 21 and the recording medium 10 and Z represents the distance between the tip 21 and the recording medium 10.

If it is assumed that the surface potential of the recording medium 10 is represented by Vs, then when a bias voltage $V = V_{AC} \sin \omega t + V_{off}$ is applied between the reading head HP and the recording medium 10, the force Fz is given by the following equation (2):

$$\begin{aligned}F_z &= -\frac{1}{2}\left(\frac{\partial C}{\partial Z}\right)(V_{AC} \cdot \sin \omega t + V_{DC})^2 \\ &= -\frac{1}{2}\left(\frac{\partial C}{\partial Z}\right)\left\{V_{DC}^2 + 2 \cdot V_{DC} \cdot V_{AC} \cdot \sin \omega t + \frac{1}{2}V_{AC}^2 \cdot (1 - \cos 2\omega t)\right\}\end{aligned} \quad (2)$$

where $V_{DC} = V_{off} + V_s$.

The cantilever 22 vibrates under the force Fz. While the cantilever 22 is vibrating, a laser beam emitted from a semiconductor laser 43 is applied to the distal end of the cantilever 22, and a laser beam reflected by the distal end of the cantilever 22 is detected by a photodetector 44 which comprises four segmental photodiodes or the like. A detected signal A from the photodetector 44 is expressed by the following equation (3):

$$\begin{aligned}A &= -a\left(\frac{\partial C}{\partial Z}\right)\left\{V_{DC}^2 + 2 \cdot V_{DC} \cdot V_{AC} \cdot \sin \omega t + \frac{1}{2}V_{AC}^2 \cdot (1 - \cos 2\omega t)\right\} \\ &= -a\left(\frac{\partial C}{\partial Z}\right)V_{DC}^2 - a_w\left(\frac{\partial C}{\partial Z}\right)V_{DC} \cdot V_{AC} \cdot \sin \omega t - 2_{2w}\left(\frac{\partial C}{\partial Z}\right)V_{AC}^2 \cdot (1 - \cos 2\omega t) \\ &= a\left(\frac{\partial C}{\partial Z}\right)V_{DC}^2 + a_w \cdot A_w + 2_{2w'} \cdot A_{2w}\end{aligned} \quad (3)$$

where a is a constant.

The detected signal A is applied to a lock-in amplifier 45, which produces an output signal based on a $2\omega$ component according to the following equation (4):

$$\overline{A_{2w}} = -\left(\frac{\partial C}{\partial Z}\right)V_{AC}^2 \quad (4)$$

The output signal based on the $2\omega$ component is supplied to a servo circuit 46, which controls the position of the support base 30 along the z-axis to make constant the output signal based on the $2\omega$ component. The $2\omega$ component is a differentiated signal of the electrostatic capacitance. If it is assumed that the dielectric constant is constant, then the distance between the tip 21 and the recording medium 10 can be controlled at a constant value by making the $2\omega$ component constant.

When the control signal for controlling the position of the support base 30 along the z-axis is converted into an image, the image represents information of the surface topography of the recording medium 10.

At the same time, the lock-in amplifier 45 produces an output signal based on a $\omega$ component according to the following equation (5):

$$\begin{aligned}\overline{A_w} &= -\left(\frac{\partial C}{\partial Z}\right)V_{DC} \cdot V_{AC} \\ &= -\left(\frac{\partial C}{\partial Z}\right)(V_{off} + V_z) \cdot V_{AC}\end{aligned} \quad (5)$$

The output signal based on the $\omega$ component depends only on the surface potential Vs of the recording medium 10. Therefore, the output signal based on the $\omega$ component corresponds to a surface potential distribution of the recording medium 10. The output signal based on the $\omega$ component is fed back to a control circuit 47 for Voff so that the output signal will not vary depending on the magnitude of $\partial C/\partial Z$ and the $\omega$ term will be zero, for thereby controlling Voff to remove the effect caused by the magnitude of $\partial C/\partial Z$ to achieve the condition:

Voff+Vs=0, i.e., Vs=−Voff.

In this manner, the surface potential Vs of the recording medium 10, i.e., the recorded information produced as the surface potential distribution of the recording medium 10, can be read.

(ii) Heterodyne detected system with the SMM configuration

Figure 6:
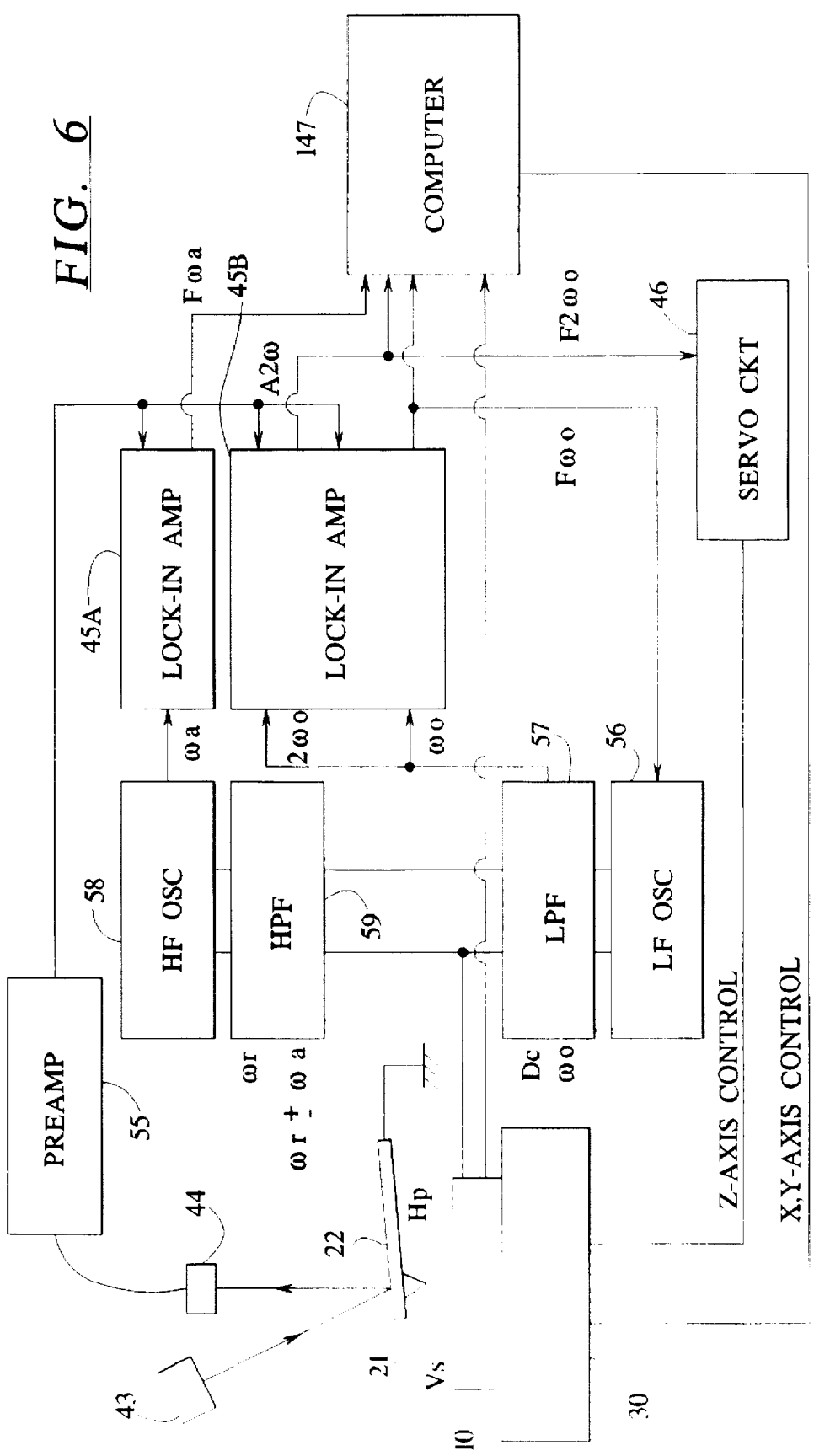
FIG. 6 is a block diagram of another information reproducing apparatus according to the present invention.

FIG. 6 shows a reading head HP and a control system of an information reproducing apparatus which incorporates a heterodyne detected system combined with the SMM configuration. Those parts shown in FIG. 6 which are identical to those shown in FIG. 5 are denoted by identical reference numerals, and will not be described in detail below.

The information reproducing apparatus shown in FIG. 6 reproduces recorded information from the recording medium 10 based on the known principles of operation of SMM combined with a heterodyne detected system (see, for example, Molecular Electronics and Bioelectronics, vol. 3, p. 79 (1992) and Vol. 79, p. 34 (1995)).

The heterodyne detected system allows an electrostatic capacitance to be detected in a frequency range higher than the resonance frequency of the cantilever for the detection of a surface potential of the recording medium according to the ordinary SMM configuration.

First, the ordinary SMM configuration will be described below.

When a bias voltage V is applied between the reading head HP or the cantilever 22 and the recording medium 10, a force Fz expressed by the above equation (1) acts between the tip 21 and the recording medium 10 due to an electrostatic coupling.

If it is assumed that the surface potential of the recording medium 10 is represented by Vs, then when a bias voltage $V=V_{AC}\cdot\sin\omega t+\text{Voff}$ is applied between the reading head HP and the recording medium 10, the force Fz is expressed by the above equation (2). The cantilever 22 vibrates under the force Fz. While the cantilever 22 is vibrating, a laser beam emitted from the semiconductor laser 43 is applied to the distal end of the cantilever 22, and a laser beam reflected by the distal end of the cantilever 22 is detected by the photodetector 44 such as a photodiode or the like. A detected signal A from the photodetector 44 is expressed by the above equation (3).

The detected signal A is applied to a lock-in amplifier 45B, which produces an output signal based on a $2\omega$ component according to the above equation (4).

The output signal based on the $2\omega$ component is supplied to the servo circuit 46, which controls the position of the support base 30 along the z-axis to make constant the output signal based on the $2\omega$ component. The $2\omega$ component is a differentiated signal of the electrostatic capacitance. If it is assumed that the dielectric constant is constant, then the distance between the tip 21 and the recording medium 10 can be controlled at a constant value by making the $2\omega$ component constant.

When the control signal for controlling the position of the support base 30 along the z-axis is converted into an image, the image represents information of the surface topography of the recording medium 10.

At the same time, the lock-in amplifier 45B produces an output signal based on a $\omega$ component according to the above equation (5).

The output signal based on the $\omega$ component depends only on the surface potential Vs of the recording medium 10. Therefore, the output signal based on the $\omega$ component corresponds to a surface potential distribution of the recording medium 10. The output signal based on the $\omega$ component is fed back so that the output signal will not vary depending on the magnitude of $\partial C/\partial Z$ and the $\omega$ term will be zero, for thereby controlling Voff to remove the effect caused by the magnitude of $\partial C/\partial Z$ to achieve the condition:

$$\text{Voff}+Vs=0,\text{ i.e., }Vs=-\text{Voff}.$$

In this manner, the surface potential Vs of the recording medium 10, i.e., the recorded information produced as the surface potential distribution of the recording medium 10, can be read.

The SMM configuration combined with the heterodyne detected system will be described below.

With the ordinary SMM configuration, the frequency characteristics are restricted by the resonant frequency of the cantilever. According to the heterodyne detected system, it is possible to detect the electrostatic capacitance or the surface potential in a frequency range higher than the mechanical resonant frequency of the cantilever. Therefore, the reading head is responsive in a frequency range up to MHz.

The principles of operation of SMM combined with the heterodyne detected system are as follows:

A voltage V(t), given below, composed of a plurality of AC voltages including a high-frequency component of MHz or higher is applied between the cantilever 22 and the recording medium 10, and induced vibrations of the cantilever 22 are detected by the photodetector 44.

$$V(t)=V_{AF}(t)+V_{RF}(t) \quad (6)$$

where $V_{AF}(t)$ is expressed by the equation (7), given below, representing a low-frequency voltage having a frequency lower than the resonant frequency of the cantilever 22 and composed of a DC bias voltage $V_C$ produced by a low-frequency oscillator 56 and a low-pass filter 57 and an AC voltage having a frequency $\omega_0$, and $V_{RF}(t)$ is expressed by the equation (8), given below, representing a high-frequency voltage having a frequency higher than the resonant frequency of the cantilever 22 and composed of a high-frequency carrier signal of a frequency $\omega_r$ from a high-pass filter 59 which is modulated with a frequency $\omega_a$ from a high-frequency oscillator 58 at a depth M of modulation ($M\approx1$).

$$V_{AF}(t)=V_{DC}+V_0\cos\omega_0 t \quad (7)$$

$$V_{RF}(t)=V_1(1+M\cos\omega_a t)\cos\omega_r t \quad (8)$$

As a result, the applied voltage comprises an AC voltage composed of five frequency components DC, $\omega_0$, $\omega_r+\omega_a$, $\omega_r-\omega_a$. When the AC voltage is applied to the cantilever 22, since the Maxwell stress is proportional to the square of the electric field, the frequencies are mixed with each other, inducing vibrations having sum and differential frequencies on the cantilever 22. The vibrations are detected by the photodetector 44 and amplified by a preamplifier 55, which applies its output signal to lock-in amplifiers 45A, 45B. The lock-in amplifiers 45A, 45B produce a heterodyne beat component, a $\omega_0$ component, and a $2\omega_0$ component which are supplied to a computer 147. Particularly, the heterodyne beat component which vibrates at $\omega_a$ gives information about the dielectric response of the recording medium 10 at the frequency $\omega_r$ as shown in the equation (9) below. Therefore, the heterodyne detected system makes it possible to detect the electrostatic capacitance of the recording medium 10 at a frequency higher than the resonant frequency of the cantilever 22. The position of the cantilever 22 is controlled by a piezoelectric element (not shown) along the z-axis such that the amplitude at $2\omega_0$ will be constant at all times.

$$F_Z(t)=\tfrac{1}{2}V_1^2MC^2(\omega_r)\cos(\omega_a t+\phi_a)+\tfrac{1}{8}V_1^2M^2C^2(\omega_r)\cos|2\omega_a t+\phi_2 a|+\text{additional term} \quad (9)$$

(iii) Kelvin force microscope (KFM) configuration

The principles of operation of the KFM configuration are known from the Kelvin force microscope (see, for example, Applied Physics Letters 52 1103 (1993)).

Figure 7:
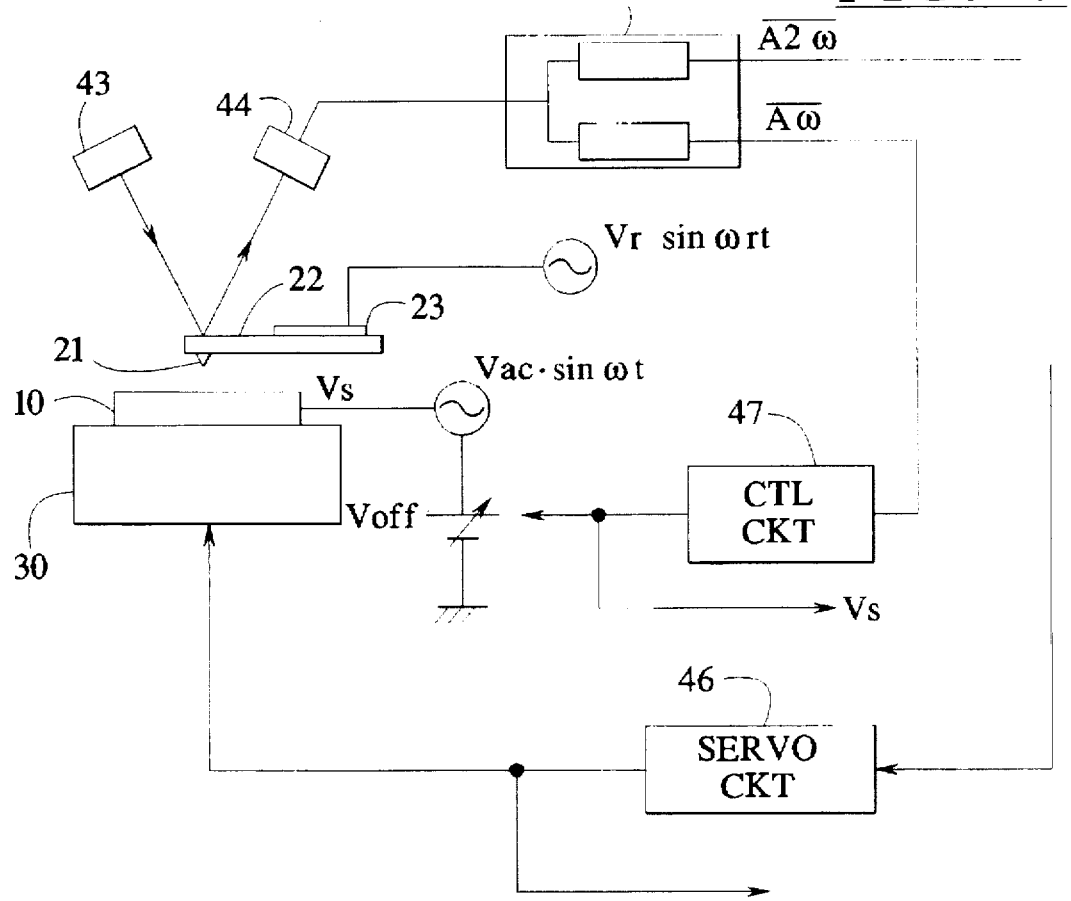
FIG. 7 is a block diagram of still another information reproducing apparatus according to the present invention.

FIG. 7 shows a reading head HP and a control system of an information reproducing apparatus which incorporates the KFM configuration. Those parts shown in FIG. 7 which are identical to those shown in FIG. 5 are denoted by identical reference numerals, and will not be described in detail below.

The reading head HP, which may be identical to the recording head HR shown in FIG. 4, is kept out of contact with the recording medium 10. The reading head HP comprises a cantilever 22 with one end fixed in position. The cantilever 22 comprises a strip-shaped leaf spring which has a tip 21 disposed on a distal end thereof and having a conical shape, a triangular pyramidal shape, or a columnar shape having a triangular cross section, for example. The cantilever 22, which is held out of contact with the recording medium 10 which is supported on a support base 30, detects a surface potential Vs of the recording medium 10 to reproduce recorded information from the recording medium 10. The cantilever 22 has a sufficiently high resonant frequency and a sufficiently low spring constant for reproducing recorded information at a high speed in a high frequency range with the KFM configuration.

The support base 30 is rotatable or movable along x- and y-axes extending perpendicularly to each other along the horizontal plane of the support base 30. The support base 30 is also movable along a z-axis in a vertical direction perpendicular to the horizontal plane of the support base 30 for adjusting the gap between the support base 30 and the tip 21.

When a bias voltage V is applied between the recording medium 10 and the cantilever 22 which is being vibrated at its resonant frequency by a piezoelectric element 23, a force Fz expressed by the above equation (1) acts between the tip 21 and the recording medium 10 due to an electrostatic coupling.

If it is assumed that the surface potential of the recording medium 10 is represented by Vs, then when a bias voltage $V=V_{AC} \sin \omega t + V_{off}$ is applied between the cantilever 22 and the recording medium 10, the force Fz is given by the following equation (10):

$$Fz = -\frac{1}{2}\left(\frac{\partial C}{\partial Z}\right)\left[\left\{(Vs + Voff)^2 + \frac{V_{AC}^2}{2}\right\} + 2(Vs + Voff)V_{AC} \cdot \sin \omega t - \frac{V_{AC}^2}{2} \cos 2\omega t\right] \quad (10)$$

The cantilever 22 vibrates under the force Fz. While the cantilever 22 is vibrating, a laser beam emitted from the semiconductor laser 43 is applied to the distal end of the cantilever 22, and a laser beam reflected by the distal end of the cantilever 22 is detected by the photodetector 44. A detected signal A from the photodetector 44 is used to detect a reduction in the amplitude of the vibrations of the cantilever 22 at its resonant frequency. The amplitude of the vibrations of the cantilever 22 at its resonant frequency is reduced by the mutual Coulomb attraction between the cantilever 22 and the recording medium 1. By detecting a reduction in the amplitude of the vibrations of the cantilever 22 at its resonant frequency or a phase change due to a frequency shift of the resonant frequency, it is possible to determine a physical quantity such as a differentiated quantity or the like of the surface potential or electrostatic capacitance.

The detected signal A is supplied to the lock-in amplifier 45, which produces an output signal based on the resonant frequency $\omega_r$ of the cantilever 22 according to the following equation (11):

$$\Delta A = -\frac{2A_0 Q}{3\sqrt{3} K}\left[\frac{H}{Z^6} + \frac{1}{2}\left(\frac{\partial^2 C}{\partial Z^2}\right)\left\{(Vs + Voff)^2 + \frac{V_{AC}^2}{2}\right\}\right] \quad (11)$$

where $\Delta A$ represents an attenuation from the free vibrational amplitude, and H represents a Hamaker constant.

The output signal based on the $\omega_r$ component is supplied to the servo circuit 46, which controls the position of the support base 30 along the z-axis to make constant the output signal based on the $\omega_r$ component. The $\omega_r$ component represents a force caused by a van der Waals force and a Coulomb force. If it is assumed that the dielectric constant is constant, then the distance between the tip 21 and the recording medium 10 can be controlled at a constant value by making the $\omega_r$ component constant.

When the control signal for controlling the position of the support base 30 along the z-axis is converted into an image, the image represents information of the surface topography of the recording medium 10.

At the same time, the lock-in amplifier 45 produces an output signal based on a $\omega$ component according to the following equation (12):

$$\overline{A\omega} = -\left[\frac{\partial C}{\partial Z}\right](Vs + Voff)V_{AC} \quad (12)$$

Since the displacement A which is measured is a differentiated signal with respect to the amplitude or phase of the vibrations of the cantilever 22 at its resonant frequency, there is obtained a signal corresponding to the differential of the surface potential Vs of the recording medium 10. The signal thus obtained corresponds to a surface potential distribution of the recording medium 10. The output signal based on the $\omega$ component is fed back to the control circuit 47 for Voff so that the output signal will not vary depending on the magnitude of $\partial C/\partial Z$ and the $\omega$ term will be zero, for thereby controlling Voff to remove the effect caused by the magnitude of $\partial C/\partial Z$ to achieve the condition:

Voff+Vs=0, i.e., Vs=-Voff.

In this manner, the surface potential Vs of the recording medium 10, i.e., the recorded information produced as a differentiated signal of the surface potential distribution of the recording medium 10, can be read.

Examples of the present invention will be described below. According to the present invention, information can be recorded and erased by polarization reversal or transport of electric charges, and recorded information can be reproduced from the recording medium as a change in electric charges, an electrostatic capacitance, or a surface potential, or a differential of such a change by the reproducing apparatus of any one of the configurations (i)–(iii) with the reading head being held out of contact with the recording medium.

Examples of apparatus for recording and erasing information by way of polarization reversal will be described below.

Recording and erasing of information by way of polarization reversal

A recording medium which is used is of the structure shown in FIG. 2 or FIG. 3. The active layer 13 comprises a ferroelectric layer made of a Bi (bismuth) laminar compound such as SrBiTiO, SrBiTao, PbBiTaO, BaBiNbO, or $SrBi_2Ta_2O_9$, or lead zirconate titanate (PZT) such as Pb(Zr, Ti)$O_3$, or a copolymer of vinylidene fluoride, which is a polymeric ferroelectric material, and trifluoroethylene (VDF-TrFE).

Information can be recorded on from the recording medium 10 with the ferroelectric layer by way of polarization reversal as follows: First, a positive voltage of 10 V, for example, is applied to the ferroelectric layer over its entire surface to polarize the ferroelectric layer in one direction. Then, a recording voltage $V_R$ whose absolute value is $|V_R|<10$ V, e.g., a negative pulse voltage ranging from –5 V to –9 V, is applied to the conductive cantilever 22 with the tip 21 of the recording head HR shown in FIG. 4, reversing the orientation of polarized molecules in a local area of the ferroelectric layer for thereby recording information on the recording medium 10.

The recorded information can be erased from the recording medium 10 as follows: A positive pulse voltage ranging from 5 V to 9 V is applied to the local area of the ferroelectric layer where the orientation of polarized molecules has been reversed, for thereby recovering the reversed orientation of polarized molecules. Since all the polarized molecules are now oriented in one direction, the recorded information is erased from the recording medium 10.

In the above recording and erasing mode, it is possible to overwrite previously recorded information with new information on the recording medium 10, without the need for separately erasing the previously recorded information prior to the overwrite process.

Information may be recorded and erased with an operating voltage lower than 10 V or less. However, the operating voltage may be lower than 5 V if the materials of the recording medium and the thicknesses of the layers thereof are optimized. Furthermore, the time required to reverse the polarization of the ferroelectric layer may be reduced to 1 ns or shorter by sufficiently reducing the diameter of a spot where the tip 21 contacts the recording medium 10 in the recording process.

A change in the electrostatic capacitance of the recording medium can be detected at such a high speed that recorded information can be reproduced at a high speed in a high frequency range of 1 MHz or higher. Since the diameter of a recording area (recording bit) on the recording medium 10 may be in the range from 50 nm to 100 nm, information can be recorded, erased, and reproduced in a highly packed recording area.

If the active layer of the recording medium 10 comprises a ferroelectric layer of $SrBi_2Ta_2O_9$, for example, then it will suffer almost no fatigue after the reversal of polarization is repeated $10^{12}$ times, the twofold value (2Pr) of its residual polarization Pr ranges from 15 to 30 $\mu C/cm^2$, and its coercive voltage is about 2 V or less. The recorded data will be retained for 10 years or more at room temperature. It has been experimentally confirmed that the time required to rewrite data is proportional to the electrode area, and can be reduced to 1 ns or less by reducing the electrode area. The capacitor area has a very fast switching capability. The recording medium is highly reliable when data are successively written and thereafter different data are written.

EXAMPLE 1

Figure 8:
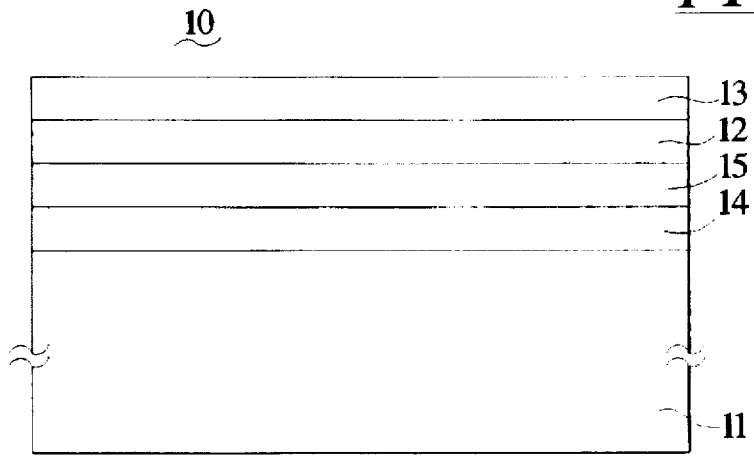
FIG. 8 is a fragmentary cross-sectional view of still another recording medium according to the present invention.

A recording medium 10 according to Example 1 had a structure shown in FIG. 8. An insulating layer 14 of $SiO_2$ was formed on a conductive substrate 11 of Si by thermal oxidation of the surface of the substrate 11. A base layer 15 of Ti was formed on the insulating layer 14, and a lower electrode layer 12 of Pt was deposited on the base layer 15 to a thickness of 300 nm on the base layer 15 by sputtering. An active layer 13 comprising a ferroelectric layer 63 of a Bi laminar compound of $SrBi_2Ta_2O_9$ was deposited on the lower electrode layer 12 according to MOD.

Information was recorded on the recording medium 10 having the ferroelectric layer 63 by the recording head HR of the recording apparatus shown in FIG. 4. Specifically, the recording medium 10 was placed on the support base 30, and, with the tip 21 held in point or ultra-small surface area contact with the ferroelectric layer 63, the support base 30 was moved to scan the tip 21 on the recording medium 10, and a pulse voltage was applied based on recording information to produce polarization reversal in a local area of the ferroelectric layer 63 to record the information. A recording pattern caused by the polarization reversal depending on the recording information was thus formed on the surface of the ferroelectric layer 63.

In Example 1, the recorded information was read or reproduced from the recording medium 10 by the reproducing apparatus of the SMM configuration (i) based on the detection of a distribution of the surface potential Vs which was produced by the polarization reversal of the ferroelectric layer 63.

Figure 9:
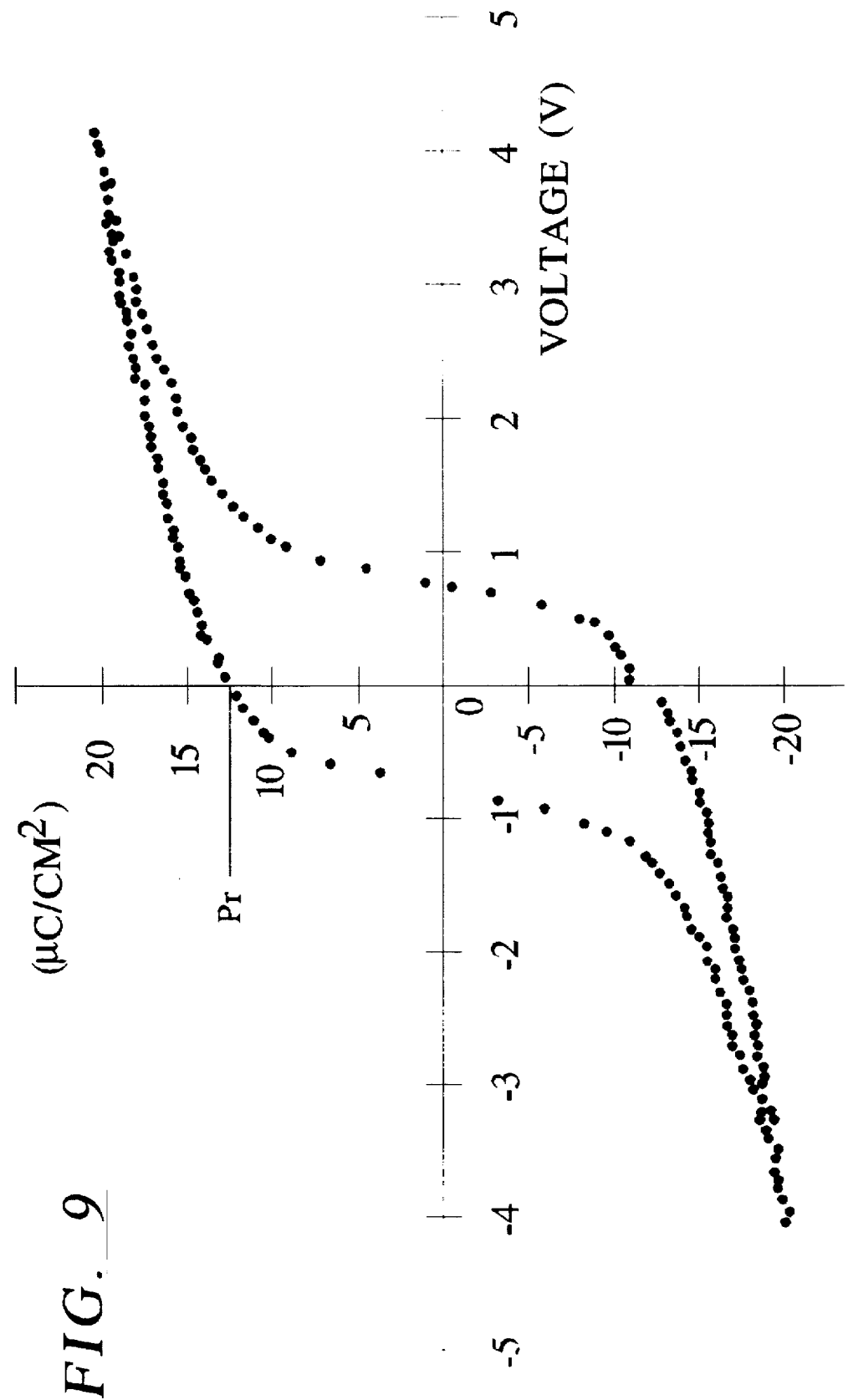
FIG. 9 is a diagram showing polarization vs. voltage characteristics of a recording medium according to an example of the present invention.

FIG. 9 shows polarization vs. voltage characteristics of the recording medium according to Example 1. The polarization vs. voltage characteristics exhibit hysteresis characteristics because the recording layer comprises the ferroelectric layer. The twofold value (2Pr) of the residual polarization Pr of the recording medium was 28 $\mu C/cm^2$, and the coercive voltage thereof was 0.8 V. It can be understood that the Bi laminar compound of $SrBi_2Ta_2O_9$ is a ferroelectric layer exhibiting good hysteresis characteristics.

Recording, erasing, and reproducing characteristics in Example 1 will be described below.

First, a DC voltage of +9 V was applied to an area having a size of 3 $\mu m \times 3$ $\mu m$ of the layer of $SrBi_2Ta_2O_9$ of the recording medium 10 to orient its spontaneous polarization in one direction. Then, a pulse voltage of $-7$ V with opposite polarity was applied to the recording medium 10 from the head, i.e., the tip 21 to reverse the polarization in a local area.

Figure 10:
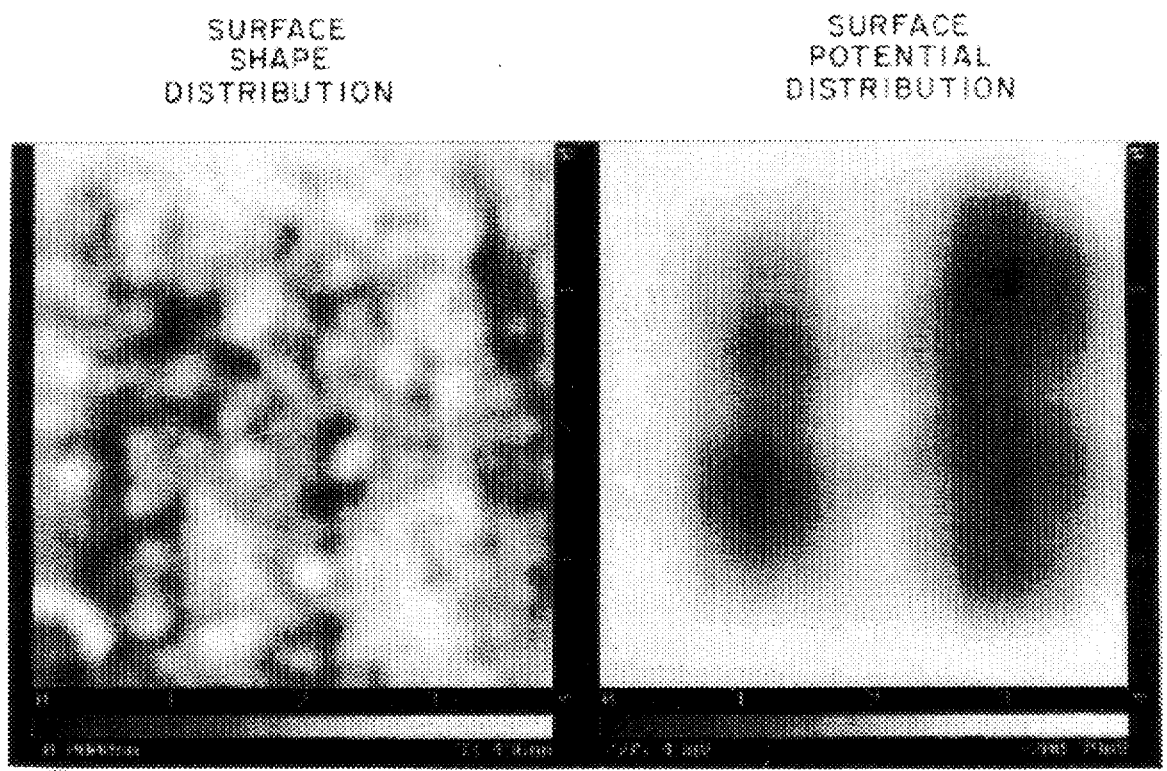
FIGS. 10 and 11 are diagrams showing intermediate-tone images, displayed on a display unit, of surface topography distributions and surface potential distributions, observed by a scanning Maxwell stress microscope, of recorded states of the recording medium shown in FIG. 9.
Figure 11:
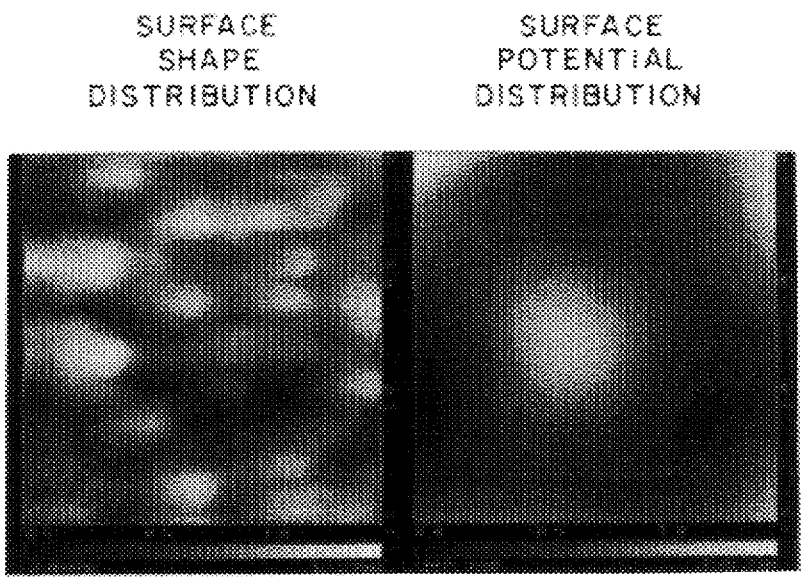

Then, the difference between the directions of polarization in the local area of the layer of $SrBi_2Ta_2O_9$ was detected as a distribution of the surface potential Vs using the reproducing apparatus of the SMM configuration shown in FIG. 5. FIGS. 10 and 11 show photographic representations of images, displayed on a display unit, of surface topography distributions and surface potential distributions, observed by a scanning Maxwell stress microscope, of recorded states of the recording medium shown in FIG. 9. The surface topography distributions shown in FIGS. 10 and 11 indicate that no change was observed on the surface topography of the recording medium after the pulse voltage was applied, and the surface of the recording medium remained unchanged and was kept in a good condition when the pulse voltage was applied. The SMM image shown in FIG. 10 has a scanning area having a size of 4 $\mu m \times 4$ $\mu m$. It shows that the area having a size of 3 $\mu m \times 3$ $\mu m$ has a low contrast, indicating polarization reversal compared with its surrounding area, and that there are three bright spots in the low-contrast area. This indicates that the polarization is reversed with respect to its surrounding area by the inverted voltage of $-7$ V. FIG. 11 shows an SMM image having a scanning area having a size of 1.5 $\mu m \times 1.5$ $\mu m$ with one spot being shown. The observed spot corresponds to an individual recording bit, showing that information can be recorded on, reproduced from, and erased from the recording medium of $SrBi_2Ta_2O_9$.

The difference between the directions of polarization represents a potential difference of about 70 mV. Since the potential resolution of SMM is 1 mV, the difference between the directions of polarization is of a value sufficiently large to differentiate the data of digital signals "0" and "1", for example.

In recording information, if a voltage of $-9$ V was applied to the ferroelectric layer 63 of $SrBi_2Ta_2O_9$ to orient the spontaneous polarization in one direction and thereafter a pulse voltage of $+7$ V with opposite polarity was applied thereto, the contrast of the image observed as a surface potential distribution by SMM was also inserted. Stated otherwise, the local polarization reversal of the ferroelectric layer 63 is inverted to record information. The recording medium also had an overwrite capability.

It was therefore indicated that the local polarization of the recording medium 10 with the ferroelectric layer 63 was oriented in the direction of the electric field upon application of the bias voltage from the tip of the cantilever of the recording head. The two types of directions of local polarization may correspond to stored states "0" and "1" of digital data. That is, high and low contrasts areas may correspond to "0" and "1" of digital data for recording highly packed information.

The recording bit shown in FIG. 10 had a diameter of about 500 nm. As a result of various experiments, it was confirmed that the diameter of the recording bit could be reduced to 100 nm or less. The time required to switch the polarization reversal was smaller than 1 μs. The local area where the direction of polarization was reversed was retained sufficiently stably.

In the reproducing mode according to the SMM configuration, the surface topography was not changed after the pulse voltage was applied. Therefore, the surface of the recording medium remained unchanged and was kept in a good condition when the pulse voltage was applied.

A recording medium which was devoid of the base layer 15 of Ti was also examined for its recording and reproducing characteristics. It was confirmed that the recording and reproducing characteristics of such a recording medium were equivalent to those of the recording medium 10 shown in FIG. 7 which included the base layer 15 of Ti.

It can be understood from the foregoing that the arrangement according to Example 1 had sufficient functions for use as a highly packed information recording and reproducing apparatus.

EXAMPLE 2

Using the same recording medium 10 as the recording medium 10 used in Example 1, i.e., the recording medium 10 having the ferroelectric layer 63 of $SrBi_2Ta_2O_9$, information was recorded on the recording medium 10 in the same manner as with Example 1. Specifically, as with Example 1, a DC voltage of +9 V was applied to the recording medium 10 to orient its spontaneous polarization in one direction, and then a pulse voltage of −7 V with opposite polarity was applied to the recording medium 10 from the recording head HR, i.e., the tip 21 to reverse the polarization in a local area based on recording information thereby to record the information.

In Example 2, the recorded information was reproduced from the recording medium 10 by the reproducing apparatus of the SMM configuration (ii) combined with the heterodyne detected system based on the detection of a distribution of the electrostatic capacitance which was produced by the polarization reversal of the ferroelectric layer 63.

Recording, erasing, and reproducing characteristics in Example 2 were the same as those in Example 1. Since the recorded information was read according to the SMM configuration (ii) combined with the heterodyne detected system, it was possible to detect and reproduce a response signal of a recording bit based on a distribution of the electrostatic capacitance corresponding to the high frequency of 10 MHz.

In Example 2, information could be recorded by applying a voltage of −9 V to orient the spontaneous polarization in one direction and thereafter applying a pulse voltage of +7 V with opposite polarity thereto from the recording head HR, i.e., the tip 21. It was possible to overwrite the recorded information on the recording medium.

In Example 2, a recording medium which was devoid of the base layer 15 of Ti was also examined for its recording, erasing, and reproducing characteristics. It was confirmed that the recording, erasing, and reproducing characteristics of such a recording medium were equivalent to those of the recording medium 10 which included the base layer 15 of Ti.

EXAMPLE 3

Using the same recording medium 10 as the recording medium 10 used in Example 1, i.e., the recording medium 10 having the ferroelectric layer 63 of $SrBi_2Ta_2O_9$, information was recorded on the recording medium 10 in the same manner as with Example 1. Specifically, as with Example 1, a DC voltage of +9 V was applied to the recording medium 10 to orient its spontaneous polarization in one direction, and then a pulse voltage of −7 V with opposite polarity was applied to the recording medium 10 from the recording head HR, i.e., the tip 21 to reverse the polarization in a local area based on recording information thereby to record the information.

Recording and erasing characteristics in Example 3 were the same as those in Example 1. The recorded information was read from the recording medium 10 by the reproducing apparatus of the KFM configuration (iii) based on the detection of the difference between the directions of polarization due to the local polarization reversal of the ferroelectric layer 63 as a distribution of the differential of the surface potential Vs.

An observation of the surface topography and a differential image of the surface potential Vs with KFM indicated that the surface topography was not unchanged after the pulse voltage was applied and the surface of the recording medium remained unchanged and was kept in a good condition when the pulse voltage was applied.

The difference between the directions of polarization represents a potential difference of about 70 mV as described above with respect to Example 1. Since the potential resolution of KFM is 3 mV, the data of digital signals "0" and "1", for example, was sufficiently differentiated by KFM.

When a cantilever having a resonant frequency of 1.5 MHz and a sufficiently small spring constant ranging from 0.1 to 3 [N/m] was used, it was possible to detect and reproduce a response signal of a recording bit in a high-frequency range of 1 MHz according to the reproducing apparatus of the KFM configuration.

When a DC voltage of −9 V was applied to the ferroelectric layer 63 to orient the spontaneous polarization in one direction and thereafter a pulse voltage of +7 V was applied thereto in the same manner as described above, the contrast of an image observed as a distribution of the differential of a change in the surface potential with KFM was reversed.

In Example 3, a recording medium which was devoid of the base layer 15 of Ti was also examined for its recording, erasing, and reproducing characteristics. It was confirmed that the recording, erasing, and reproducing characteristics of such a recording medium were equivalent to those of the recording medium 10 which included the base layer 15 of Ti.

EXAMPLE 4

The same arrangement as that of Example 1 was employed except that the ferroelectric layer 63 of the recording medium 10 was made of $SrBi_2Nb_2O_9$. Example 4 exhibited the same recording, erasing, and reproducing characteristics as those of Example 1.

EXAMPLE 5

The same arrangement as that of Example 2 was employed except that the ferroelectric layer 63 of the recording medium 10 was made of $SrBi_2Nb_2O_9$. Example 5 exhibited the same recording, erasing, and reproducing characteristics as those of Example 2.

EXAMPLE 6

The same arrangement as that of Example 3 was employed except that the ferroelectric layer 63 of the recording medium 10 was made of $SrBi_2Nb_2O_9$. Example 6 exhibited the same recording, erasing, and reproducing characteristics as those of Example 3.

EXAMPLE 7

The active layer 13 of the recording medium 10, which records information therein, comprised a ferroelectric layer of PZT (Pb(Zr, Ti)O$_3$).

Figure 12:
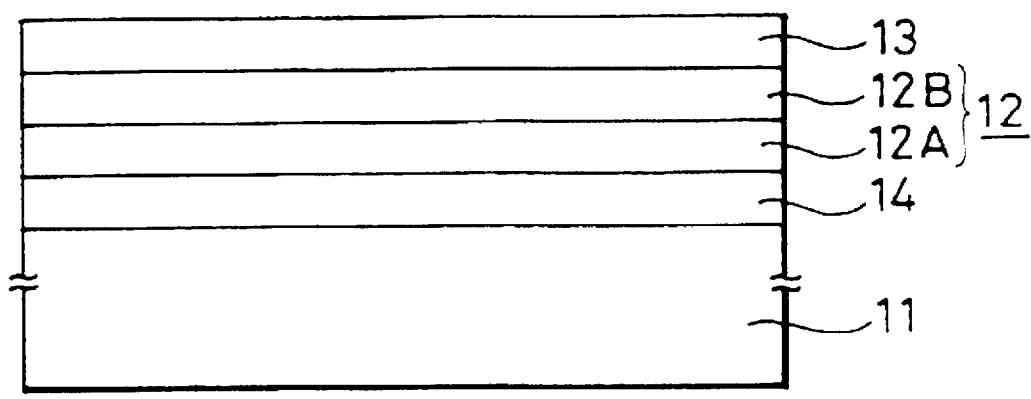
FIG. 12 is a fragmentary cross-sectional view of a recording medium according to another example of the present invention.

The recording medium 10 according to Example 7 has a structure shown in FIG. 12. An insulating layer 14 of SiO$_2$ formed on a conductive substrate 11 of Si by thermal oxidation of the surface of the substrate 11, and an electrode layer 12A of IrO$_2$ and an electrode layer 12B of Ir were successively deposited to a thickness of 300 nm on the insulating layer 14 by sputtering, the electrode layers 12A, 12B jointly serving as a lower electrode layer 12. A ferroelectric layer 63 of lead zirconate titanate (PZT (Pb(Zr, Ti)O$_3$) was deposited to a thickness of 300 nm on the lower electrode layer 12 according to sputtering.

The twofold value (2Pr) of the residual polarization Pr of PZT ranged from 40 to 60 μC/cm$^2$, i.e., was about twice that of the ferroelectric layer 63 of SrBi$_2$Ta$_2$O$_9$ in Example 1, and the coercive voltage of PZT was 2 V or less.

The fatigue of the ferroelectric layer of PZT which has heretofore been problematic was improved by using the electrode base layer of an oxide. The time required to rewrite data was 1 ns or less because the area of contact between the recording medium and the cantilever was small. The capacitor area had a very fast switching capability. The recording medium was highly reliable when data were successively written and thereafter different data were written.

In Example 7, information was recorded, erased, and reproduced in the same manner as with Example 1. The recorded information was reproduced, i.e., a distribution of the surface potential based on the recorded information was detected, by the reproducing apparatus of the SMM configuration (i).

The recording medium in Example 7 had hysteresis characteristics due to the voltage dependency of the polarization, and exhibited characteristics inherent in the ferroelectric material. The twofold value (2Pr) of its residual polarization Pr was 40 μC/cm$^2$, and its coercive voltage was 2 V or less.

Recording, erasing, and reproducing characteristics in Example 7 will be described below.

First, a voltage of +9 V and an electric field of 0.8 MV/cm was applied to an area having a size of 4 μm×4 μm of the ferroelectric layer of PZT to orient its spontaneous polarization in one direction. Then, a pulse voltage of −7 V with opposite polarity was applied to the ferroelectric layer of PZT to reverse the polarization in a local area thereby to record information. An examination of a distribution of the surface potential of the recording medium indicated that the area in which the polarization was reversed was observed as being brighter than a surrounding area, showing the polarization reversal in that area. Therefore, the information can be detected or reproduced by SMM.

In Example 7, therefore, the direction of polarization was reversed by the application of the voltage of −7 V, indicating that the direction of polarization was aligned with the direction of the electric field as a feature of the ferroelectric material. The two types of directions of local polarization may correspond to stored states "0" and "1" of digital data. That is, high and low contrasts areas may correspond to "0" and "1" of digital data for recording highly packed information.

As a result of various experiments, it was confirmed that the diameter of the recording area (recording bit) could be reduced to 100 nm or less. The time required to switch the polarization reversal was smaller than 1 μs. The local area where the direction of polarization was reversed was retained sufficiently stably.

In the reproducing mode according to the SMM configuration, the surface topography was not changed after the pulse voltage was applied. Therefore, the surface of the recording medium remained unchanged and was kept in a good condition when the pulse voltage was applied.

In Example 7, it was also possible to record information by applying a DC voltage of −9 V to orient the spontaneous polarization of the ferroelectric layer in one direction, and then applying a pulse voltage of +7 V was applied from the recording head HR, i.e., the tip 21.

It was possible to overwrite the recorded information on the recording medium.

It can be understood from the foregoing that the arrangement according to Example 7 had sufficient functions for use as a highly packed information recording and reproducing apparatus.

EXAMPLE 8

Using the same recording medium 10 as the recording medium 10 used in Example 7, i.e., the recording medium 10 having the ferroelectric layer of PZT, information was recorded on the recording medium 10 in the same manner as with Example 7. Specifically, as with Example 7, a DC voltage of +9 V was applied to the recording medium 10 to orient its spontaneous polarization in one direction, and then a pulse voltage of −7 V with opposite polarity was applied to the recording medium 10 from the recording head HR, i.e., the tip 21 to reverse the polarization in a local area based on recording information thereby to record the information.

In Example 8, the recorded information was reproduced from the recording medium 10 by the reproducing apparatus of the SMM configuration (ii) combined with the heterodyne detected system based on the detection of a distribution of the electrostatic capacitance which was produced by the polarization reversal of the ferroelectric layer 63.

Recording, erasing, and reproducing characteristics in Example 8 were the same as those in Example 7. Since the recorded information was read according to the SMM configuration (ii) combined with the heterodyne detected system, it was possible to detect and reproduce a response signal of a recording bit based on the difference between electrostatic interactions in a high frequency range of 10 MHz.

In Example 8, information could be recorded by applying a voltage of −9 V to orient the spontaneous polarization in one direction and thereafter applying a pulse voltage of +7 V with opposite polarity thereto from the recording head HR, i.e., the tip 21. It was possible to overwrite the recorded information on the recording medium.

EXAMPLE 9

Using the same recording medium 10 as the recording medium 10 used in Example 7, i.e., the recording medium 10 having the ferroelectric layer of PZT, information was recorded on the recording medium 10 in the same manner as with Example 7. Specifically, as with Example 7, a DC voltage of +9 V was applied to the recording medium 10 to orient its spontaneous polarization in one direction, and then a pulse voltage of −7 V with opposite polarity was applied to the recording medium 10 from the recording head HR, i.e., the tip 21 to reverse the polarization in a local area based on recording information thereby to record the information.

The recorded information was reproduced from the recording medium 10 by the reproducing apparatus of the KFM configuration (iii) based on the detection of the difference between the directions of polarization due to the local polarization reversal of the ferroelectric layer 63 as a distribution of the differential of the surface potential Vs.

An observation of the surface topography and a differential image of the surface potential Vs with KFM indicated that the surface topography was not unchanged after the pulse voltage was applied and the surface of the recording medium remained unchanged and was kept in a good condition when the pulse voltage was applied.

When a cantilever having a resonant frequency of 1.5 MHz and a sufficiently small spring constant ranging from 0.1 to 3 [N/m] was used, it was possible to detect and reproduce a response signal of a recording bit in a high-frequency range of 1 MHz according to the reproducing apparatus of the KFM configuration.

When a DC voltage of −9 V was applied to the ferroelectric layer 63 to orient the spontaneous polarization in one direction and thereafter a pulse voltage of +7 V was applied thereto from the recording head HR, i.e., the tip 21, it was possible to record information on the recording medium.

It was possible to overwrite the recorded information on the recording medium.

EXAMPLE 10

The active layer 13 of the recording medium 10, which records information therein, comprised a polymeric ferroelectric layer.

Figure 13:
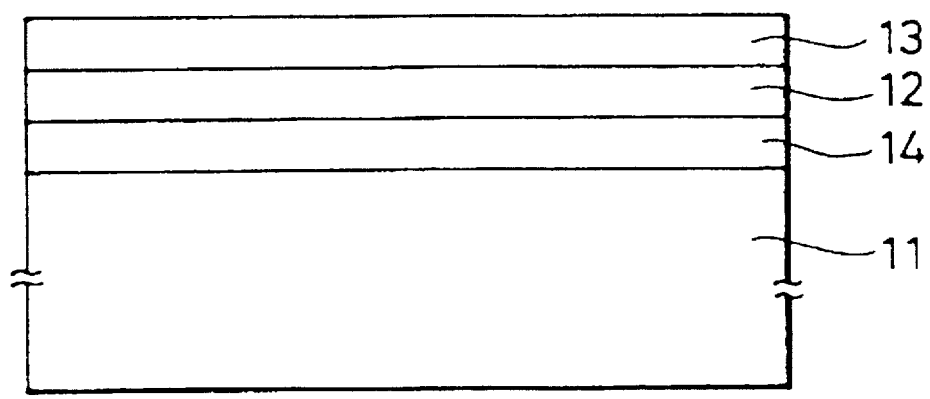
FIG. 13 is a fragmentary cross-sectional view of a recording medium according to still another example of the present invention.

The recording medium 10 according to Example 10 had a structure shown in FIG. 13. An insulating layer 14 of $SiO_2$ having a thickness of 20 nm was formed on a conductive substrate 11 of Si by thermal oxidation of the surface of the substrate 11, and a lower electrode layer 12 of Pt was deposited on the insulating layer 14 by sputtering. A thin-film layer 123 of a copolymer of vinylidene fluoride, which was a polymeric ferroelectric material, and trifluoroethylene (VDF-TrFE) was deposited to a thickness of 300 nm on the lower electrode layer 12 according to vapor deposition or spin coating. The thin-film layer 123 contained 50 % or more of vinylidene fluoride, and exhibited a ferroelectric property.

Information was recorded on the recording medium 10 by the recording apparatus shown in FIG. 4. However, a voltage of +20 V was applied to the recording medium 10 to orient its spontaneous polarization in one direction, and then a pulse voltage of −10 V was applied to the recording medium 10 to reverse the polarization in a local area based on recording information thereby to record the information. The recorded information was reproduced by the reproducing apparatus of the SMM configuration (i) as with Example 1.

Recording, erasing, and reproducing characteristics in Example 10 will described below.

First, a voltage of +20 V was applied to an area having a size of 5 µm×5 µm of the polymeric ferroelectric layer to orient its spontaneous polarization in one direction. Then, a voltage of −7 V with opposite polarity was applied to the polymeric ferroelectric layer to reverse the polarization in a local area. An evaluation of a distribution of directions of polarization with SMM indicated that the contrast of the area having the size of 5 µm×5 µm was lower, with an area being present which was brighter than the surrounding area, showing that the polarization was reversed in such an area. This indicates that the direction of polarization is reversed by the application of the voltage of −10 V, and that the recorded information can be reproduced based on the local polarization reversal. It was possible to overwrite the recorded information on the recording medium.

The two types of directions of local polarization may correspond to stored states "0" and "1" of digital data. That is, high and low contrasts areas may correspond to "0" and "1" of digital data for recording highly packed information.

As a result of various experiments, it was confirmed that the diameter of the recording bit could be reduced to 100 nm or less. The time required to switch the polarization reversal was smaller than 1 µs. The local area where the direction of polarization was reversed was retained sufficiently stably.

In the reproducing mode according to the SMM configuration, the surface topography was not changed after the pulse voltage was applied. Therefore, the surface of the recording medium remained unchanged and was kept in a good condition when the pulse voltage was applied.

In Example 10, it was also possible to record information by applying a DC voltage of −20 V to orient the spontaneous polarization of the ferroelectric layer in one direction, and then applying a pulse voltage of +10 V was applied from the recording head HR, i.e., the tip 21.

It was possible to overwrite the recorded information on the recording medium.

It can be understood from the foregoing that the arrangement according to Example 10 had sufficient functions for use as a highly packed information recording and reproducing apparatus.

EXAMPLE 11

Using the same recording medium 10 as the recording medium 10 used in Example 10, i.e., the recording medium 10 having the polymeric ferroelectric layer, information was recorded on the recording medium 10 in the same manner as with Example 10. Specifically, as with Example 10, a DC voltage of +20 V was applied to the recording medium 10 to orient its spontaneous polarization in one direction, and then a pulse voltage of −10 V with opposite polarity was applied to the recording medium 10 from the recording head HR, i.e., the tip 21 to reverse the polarization in a local area based on recording information thereby to record the information.

In Example 11, the recorded information was reproduced from the recording medium 10 by the reproducing apparatus of the SMM configuration (ii) combined with the heterodyne detected system based on the detection of a distribution of the surface potential Vs which was produced by the polarization reversal of the ferroelectric layer 123.

Recording and erasing characteristics in Example 11 were the same as those in Example 10. Since the recorded information was read according to the SMM configuration (ii) combined with the heterodyne detected system, it was possible to detect and reproduce a response signal of a recording bit based on the difference between electrostatic interactions in a high frequency range of 10 MHz.

In Example 11, information could be recorded by applying a voltage of −20 V to orient the spontaneous polarization in one direction and thereafter applying a pulse voltage of +10 V with opposite polarity thereto from the recording head HR, i.e., the tip 21. It was possible to overwrite the recorded information on the recording medium.

It can be understood from the foregoing that the arrangement according to Example 11 had sufficient functions for use as a highly packed information recording and reproducing apparatus.

EXAMPLE 12

Using the same recording medium 10 as the recording medium 10 used in Example 10, i.e., the recording medium 10 having the polymeric ferroelectric layer, information was recorded on the recording medium 10 in the same manner as with Example 10. Specifically, as with Example 10, a DC voltage of +20 V was applied to the recording medium 10 to orient its spontaneous polarization in one direction, and then a pulse voltage of −10 V with opposite polarity was applied to the recording medium 10 from the recording head HR, i.e., the tip 21 to reverse the polarization in a local area based on recording information thereby to record the information.

Recording and erasing characteristics in Example 12 were the same as those in Example 10. The recorded information was read from the recording medium 10 by the reproducing apparatus of the KFM configuration (iii) based on the detection of the difference between the directions of polarization due to the local polarization reversal of the ferroelectric layer 123 as a distribution of the differential of the surface potential Vs.

An observation of the surface topography and a differential image of the surface potential Vs with KFM indicated that the surface topography was not unchanged after the pulse voltage was applied and the surface of the recording medium remained unchanged and was kept in a good condition when the pulse voltage was applied.

The data of digital signals "0" and "1", for example, was sufficiently differentiated by KFM.

When a DC voltage of −20 V was applied to the ferroelectric layer to orient the spontaneous polarization in one direction and thereafter a pulse voltage of +10 V was applied thereto from the recording head HR, i.e., the tip 21, it was possible to record information on the recording medium.

It was possible to overwrite the recorded information on the recording medium.

It can be understood from the foregoing that the arrangement according to Example 12 had sufficient functions for use as a highly packed information recording and reproducing apparatus.

In Examples 1~12 described above, the ferroelectric layer of the recording medium was made of SrBiTao, SrBi$_2$Nb$_2$O$_9$, Pb(Zr, Ti)O$_3$PZT, or VDF-TrFE. However, the ferroelectric layer may be made of a Bi laminar compound, Ladoped PZT (PLZT), or other polymeric ferroelectric material.

In Examples 1~12 described above, the lower electrode 12 was disposed below the active layer 13, which is the ferroelectric layer in Examples 1~12, on the surface of the substrate 11 closer to the active layer 13, as shown in FIG. 2. However, the lower electrode 12 may be disposed on the surface of the substrate 11 remote from the active layer 13 as shown in FIG. 3. For recording information on the recording medium 10 of the structure shown in FIG. 3, the features of the ferroelectric layer are employed, i.e., the ferroelectric layer has spontaneous polarization and the direction thereof can be controlled by an applied electric field, so that the ferroelectric layer has two stable states with respect to the direction of the electric field and the stable states can be retained after removal of the electric field. These two stable states correspond to digital data "0" and "1", and high-speed switching is achieved between the two stable states to cause a "stored state" and a "depleted state" of a space charge layer formed on the surface of the semiconductor substrate to correspond to the digital data "0" and "1", respectively for recording those digital data.

Figure 14:
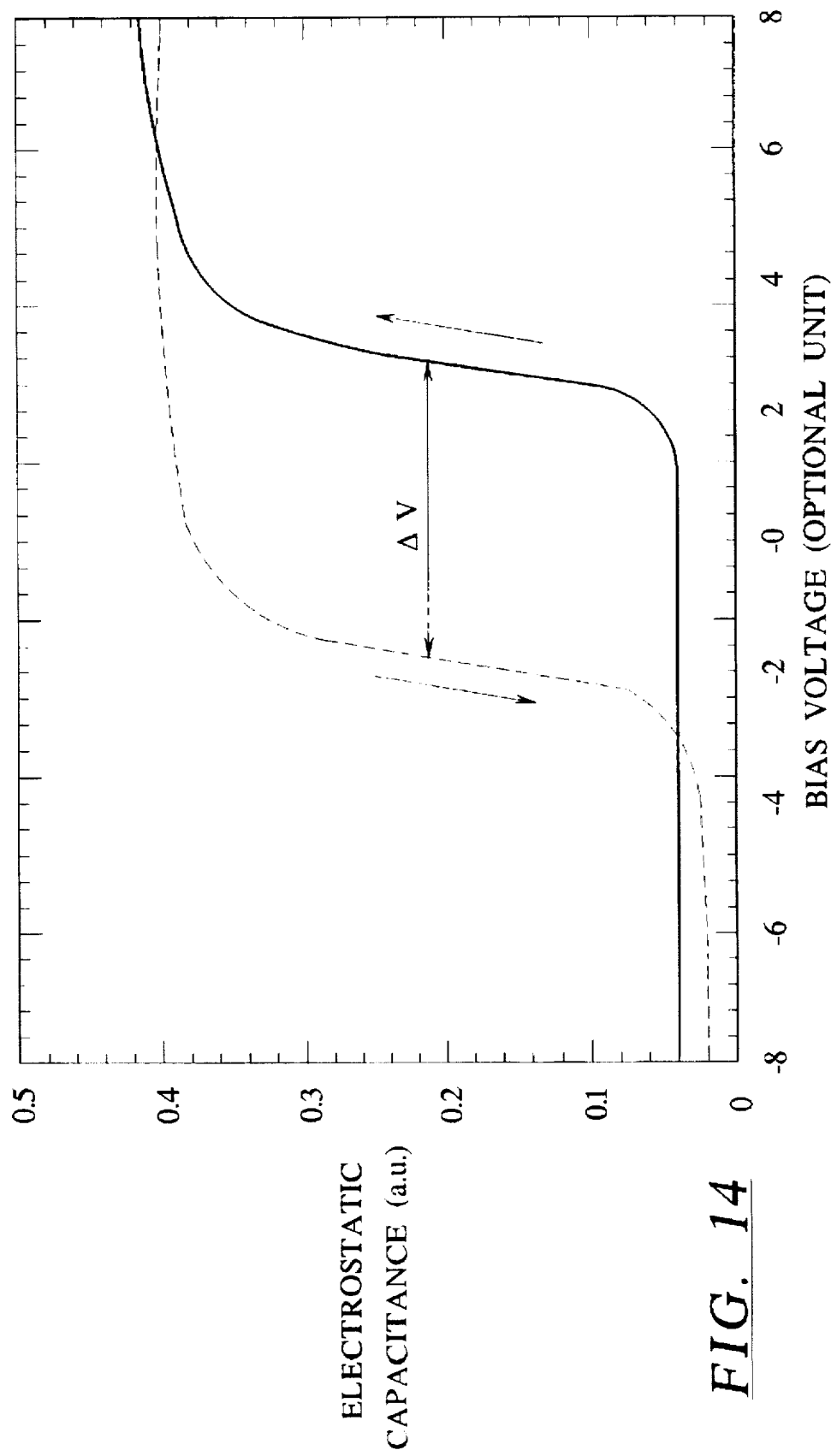
FIG. 14 is a diagram showing polarization vs. voltage characteristics of a recording medium according to yet still another example of the present invention.

FIG. 14 shows the voltage dependency of the electrostatic capacitance of the recording medium. The electrostatic capacitance exhibits a hysteresis property with respect to the applied bias voltage. The hysteresis property corresponds to two states, i.e., the "stored state" and the "depleted state", of the space charge layer formed on the surface of the semiconductor substrate depending on the direction of spontaneous polarization of the ferroelectric layer. A shift ΔV of the voltage in FIG. 14 depends on the magnitude of the spontaneous polarization of the ferroelectric layer.

Information may be recorded on the recording medium of the above structure according to the AFM configuration shown in FIG. 4, and the recorded information may be reproduced by any one of the configurations (i)~(iii).

Specifically, a positive voltage of +10 V, for example, is applied to the ferroelectric layer to orient the spontaneous polarization in one direction and thereafter a negative pulse voltage of −9 V, for example, is applied to the tip of the recording head HR to reverse the direction of polarization of the ferroelectric layer to bring the space charge layer into the "stored state" or the "depleted state" for thereby recording information. Then, a pulse voltage of 7 V is applied to reverse the direction of polarization to erase the recorded information. Conversely, a negative voltage of −10 V, for example, may be applied to the ferroelectric layer to orient the spontaneous polarization in one direction and thereafter a positive pulse voltage of +9 V, for example, is applied to record information. At any rate, since the recording medium is capable of overwriting recorded information, the recorded information may not necessarily be erased.

The recorded information is reproduced as a change in the electrostatic capacitance or a change in the surface potential between the stored and depleted states of the space charge layer in a local area of the recording medium in which the direction of polarization is reversed and a local area of the recording medium in which the direction of polarization is not reversed. Since the surface potential or the electrostatic capacitance caused by an electrostatic interaction between the cantilever and the spontaneous polarization is directly detected rather than detecting the capacitance of the space charge layer itself, the space charge layer is prevented from being virtually spread.

Information can be recorded or erased at a voltage lower than 20 V, e.g., 10 V or a lower voltage. The voltage may be lower than 5 V if parameters, e.g., the materials of the recording medium and the thicknesses of the layers thereof, are optimized. Furthermore, the time required to reverse the polarization of the ferroelectric layer may be reduced to 1 ns or shorter by sufficiently reducing the diameter of a spot where the tip 21 contacts the recording medium 10 in the recording process. Furthermore, the polarization can be reversed and the space charge layer can be switched in 1 μs or less according to the present invention. A change in the electrostatic capacitance could be detected at high speeds, e.g., at a frequency of 1 MHz or higher. Highly packed information could be recorded in a recording region (recording bit) having a diameter ranging from 50 to 100 nm.

When a cantilever having a resonant frequency of 1.5 MHz and a sufficiently small spring constant ranging from 0.1 to 3.0 [N/m] was used, it was possible to detect and reproduce a response signal of a recording bit in a high-frequency range of 1 MHz according to the reproducing apparatus of the KFM configuration.

EXAMPLE 13

A recording medium 10 according to Example 13 had a structure shown in FIG. 15. A base or buffer layer 9 of SrTiO$_3$ was deposited to a thickness of 30 nm on a principal surface of a substrate 11 of single-crystal Si by sputtering, and then heated at 650° C. in an oxygen atmosphere. The base layer 9 of SrTiO$_3$ thus formed matched the substrate 11, and was produced as a buffer layer with excellent crystallinity. A ferroelectric layer 73 of Pb(Zr, Ti)O$_3$ (PZT) was deposited as an active layer 13 to a thickness of 300 nm on the base or buffer layer 9 by MOCVD. The ferroelectric layer 73 thus formed had a Perovskite crystal structure, and had a high-density fine grain. Since the heated base or buffer layer 9 of SrTiO$_3$ had a Perovskite crystal structure and a close lattice constant, it would operate as an effective initial nucleus upon crystalline growth of the film of PZT. Therefore, the base or buffer layer 9 can be used as a base for growing PZT thereon. A lower electrode 12 was formed in ohmic contact with the reverse side of the substrate 11.

The twofold value (2Pr) of the residual polarization Pr of PZT ranged from 40 to 60 µC/cm$^2$, and the coercive voltage, which was 0 upon polarization, of PZT was 2 V or less. The fatigue of PZT was improved by optimizing the fabrication process and inserting the buffer or base layer 9, and any reduction in the residual polarization was recognized after the polarization reversal was repeated $10^{11}$ times. The time required to rewrite data was 2 ns.

Information was recorded on the recording medium 10 having the ferroelectric layer 73 by the recording head HR of the recording apparatus shown in FIG. 4. Specifically, the recording medium 10 was placed on the support base 30, and, with the tip 21 held in point or ultra-small surface area contact with the ferroelectric layer 63, the support base 30 was moved to scan the tip 21 on the recording medium 10, and a pulse voltage was applied based on recording information to produce polarization reversal in a local area of the ferroelectric layer 63 to record the information.

The recorded information was read or reproduced from the recording medium 10 based on the detection of the difference between distributions of the surface space charge layer due to the local polarization reversal of the ferroelectric layer 73 as a distribution of the surface charge layer, i.e., as a distribution of the surface potential Vs. In Example 13, the recorded information was reproduced by the reproducing apparatus of the SMM configuration (i) shown in FIG. 5.

The recording medium in Example 13 was evaluated for voltage vs. polarization characteristics.

The voltage vs. polarization characteristics exhibited hysteresis characteristics inherent in the ferroelectric material. The twofold value (2Pr) of the residual polarization Pr was 40 µC/cm$^2$, and the coercive voltage was about 1.5 V. This indicates that the thin film of PZT on the SrTiO$_3$ and Si layers is a ferroelectric layer exhibiting good hysteresis characteristics.

Recording, erasing, and reproducing characteristics in Example 13 will be described below.

First, a DC voltage of +9 V was applied to an area having a size of 3 µm×3 µm of the ferroelectric layer of PZT to orient its spontaneous polarization in one direction. Then, a pulse voltage of −7 V with opposite polarity was applied from the head, i.e., the tip 21 to change the state of the space charge layer caused by spontaneous polarization from the "stored state" to the "depleted state" or vice versa, developing a local distribution of the space charge layer depending on recording information. Then, a distribution of space charge layer differences caused by the direction of the local polarization of the ferroelectric layer of PZT was detected or reproduced as a distribution of the surface potential by the reproducing apparatus with the SMM configuration (i).

The surface topography and the surface potential of the recording medium to which the pulse voltage was applied were reviewed by SMM. A scanned area of the SMM image at this time had a size of 5 µm×5 µm. The contrast of an area having a size of 3 µm×3 µm was low, and a spot or a recording bit was observed where the polarization was reversed and the spontaneous polarization of PZT was reversed in one direction with a higher space contrast than the surrounding area. This spot corresponded to an area where the state of the space charge layer was reversed due to the polarization reversal caused by the application of the voltage of −7 V.

The difference between the directions of polarization, i.e., the difference between the mutual Coulomb attractions caused by the two states of the space charge layer, i.e., the "stored state" and the "depleted state", is about 50 mV in terms of a surface potential difference. Since the potential resolution of SMM was 1 mV, it was found out that a change in the electrostatic capacitance between the "stored state" and the "depleted state" of the space charge layer of the Si substrate could be detected as a change in the surface potential to reproduce the recorded information out of contact with the recording medium.

When a negative voltage of −9 V was first applied to the recording medium and then a pulse voltage of +7 V was applied thereto, i.e., when voltages of opposite polarity to the polarity described above were successively applied, the contrast of an image observed as a distribution of the surface potential by SMM was also reversed. It was thus found out that the state of the space charge layer caused by the local polarization reversal of PZT was reversed. It was also found out that the recording medium had an overwriting capability.

Consequently, it was understood that the state of the space charge layer caused by the local polarization reversal of the thin-film recording medium of a ferroelectric material was aligned with the direction of an electric field generated by the application of a bias voltage from the recording head, i.e., the cantilever. The "stored state" and the "depleted state" of the space charge layer on the surface of the Si substrate due to the two directions of local polarization may correspond to stored states "0" and "1" of digital data for recording, erasing, and reproducing information. That is, high and low contrasts areas may correspond to "0" and "1" of digital data for recording highly packed information.

As a result of various experiments, it was confirmed that the diameter of the recording bit, which serves as a criterion for a surface recording density, could be reduced to 100 nm or less. The time required to switch between "stored state" and the "depleted state" of the space charge layer caused by the polarization reversal was smaller than 1 µs. Information recorded in the local area where the direction of polarization was reversed was retained sufficiently stably.

It can be understood from the foregoing that the arrangement according to Example 13 had sufficient functions for use as a highly packed information recording and reproducing apparatus.

EXAMPLE 14

Information was recorded on the same recording medium as with Example 13 according to the same recording process as with Example 13. In Example 14, the recorded information was reproduced by the reproducing apparatus of the SMM configuration (ii) combined with the heterodyne detected system.

Recording and erasing characteristics in Example 14 were the same as those in Example 13. Since the recorded information was read according to the SMM configuration (ii) combined with the heterodyne detected system, it was possible to detect and reproduce a response signal of a recording bit based on the difference between electrostatic interactions in a high frequency range of 10 MHz.

It can be understood from the foregoing that the arrangement according to Example 14 had sufficient functions for use as a highly packed information recording and reproducing apparatus.

EXAMPLE 15

Information was recorded on the same recording medium as with Example 13 according to the same recording process as with Example 13. In Example 15, the recorded information was reproduced by the reproducing apparatus of the KFM configuration (iii).

Recording and erasing characteristics in Example 14 were the same as those in Example 13.

The difference between the directions of polarization, i.e., the difference between the mutual Coulomb attractions caused by the two states of the space charge layer, is about 50 mV in terms of a surface potential difference. Since the potential resolution of KFM was about 3 mV, it was found out that a change in the electrostatic capacitance between the "stored state" and the "depleted state" of the space charge layer of the Si substrate could be detected as a change in the surface potential to reproduce the recorded information out of contact with the recording medium.

When a cantilever having a resonant frequency of 1.5 MHz and a sufficiently small spring constant ranging from 0.1 to 3 [N/m] was used, it was possible to detect and reproduce a response signal of a recording bit in a high-frequency range of 1 MHz according to the reproducing apparatus of the KFM configuration.

It can be understood from the foregoing that the arrangement according to Example 15 had sufficient functions for use as a highly packed information recording and reproducing apparatus.

EXAMPLE 16

A recording medium 10 according to Example 16 had a structure shown in FIG. 16. The recording medium 10 had an active layer 13 comprising a ferroelectric layer 103 doped with a certain amount of La, i.e., of Pb(La, Zr, Ti)O$_3$ (PLZT).

Since oxygen pores in the PZT were replaced with La in PLZT, the leakage current characteristics of the PLZT were improved by one figure over the PZT.

The PLZT is a material of reduced fatigue due to polarization reversal. The twofold value (2Pr) of its residual polarization Pr ranged from 30 to 50 µC/cm$^2$, and its coercive voltage was about 2 V or less. The PLZT will retain the recorded data for 10 years or more at room temperature. The time required to rewrite data is 5 ns or less, and the switching speed is very fast. The PLZT is highly reliable when data are successively written and thereafter different data are written.

The ferroelectric active layer 13 of PLZT was formed as follows: A heated base or buffer layer 9 of SrTiO$_3$ was deposited to a thickness of 30 nm on a substrate 11 of Si, and then a PLZT layer with 10 mol % of La added thereto was deposited to a thickness of 300 nm on the base or buffer layer 9 by MOCVD. The PLZT layer thus formed had a Perovskite crystal structure, and had a high-density fine grain.

Because the polarization of the recording medium were voltage-dependent, the PLZT exhibited hysteresis characteristics inherent in the ferroelectric material. In Example 16, the twofold value (2Pr) of the residual polarization Pr was 40 µC/cm$^2$, and the coercive voltage is 1.5 V.

In Example 16, information was recorded, erased, and reproduced in the same manner as with Example 12.

Recording, erasing, and reproducing characteristics in Example 16 will be described below.

First, a DC voltage of +9 V was applied to an area having a size of 3 µm×3 µm of the thin film of PLZT to orient its spontaneous polarization in one direction. Then, a pulse voltage of −7 V with opposite polarity was applied from the head, i.e., the tip 21 to change the state of the space charge layer caused by spontaneous polarization from the "stored state" to the "depleted state" or vice versa, developing a local distribution of the space charge layer depending on recording information. Then, a distribution of space charge layer differences caused by the direction of the local polarization of the PLZT film was detected or reproduced as a distribution of the surface potential by the reproducing apparatus with the SMM configuration (i).

A distribution of the surface potential was evaluated by SMM. As a result, the contrast of an area having a size of 3 µm×3 µm was low, indicating that the state of the space charge layer caused by the polarization reversal was reversed into one state, compared with the surrounding area. A bright spot, i.e., a recording bit, was observed in the low-contrast area. This indicated that the state of the space charge layer was made opposite to the surrounding area due to the application of the voltage of −7 V. The state of the space charge layer caused by the direction of polarization was aligned with the direction of an electric field in a local area as a feature of the ferroelectric material. It was possible to overwrite the recorded information. The "stored state" and the "depleted state" of the space charge layer due to the two directions of local polarization may correspond to stored states "0" and "1" of digital data. That is, high and low contrasts areas may correspond to "0" and "1" of digital data for recording highly packed information.

As a result of various experiments, it was confirmed that the diameter of the small recording area or the recording bit could be reduced to 100 nm or less.

The local area of the space charge layer where the direction of polarization was reversed was retained sufficiently stably.

It can be understood from the foregoing that the arrangement according to Example 16 had sufficient functions for use as a highly packed information recording and reproducing apparatus.

EXAMPLE 17

Information was recorded on the same recording medium as with Example 16 according to the same recording process as with Example 16. In Example 17, the recorded information was reproduced by the reproducing apparatus of the SMM configuration (ii) combined with the heterodyne detected system.

Recording and erasing characteristics in Example 17 were the same as those in Example 16. Since the recorded information was read according to the SMM configuration (ii) combined with the heterodyne detected system, it was possible to detect and reproduce a response signal of a recording bit based on the difference between electrostatic interactions in a high frequency range of 10 MHz.

It can be understood from the foregoing that the arrangement according to Example 17 had sufficient functions for use as a highly packed information recording and reproducing apparatus.

EXAMPLE 18

Information was recorded on the same recording medium as with Example 16 according to the same recording process as with Example 16. In Example 18, the recorded information was reproduced by the reproducing apparatus of the KFM configuration (iii).

Recording and erasing characteristics in Example 18 were the same as those in Example 16.

The difference between the directions of polarization, i.e., the difference between the mutual Coulomb attractions caused by the two states of the space charge layer, is about 50 mV in terms of a surface potential difference. Since the potential resolution of KFM was about 3 mV, it was found out that a change in the electrostatic capacitance between the "stored state" and the "depleted state" of the space charge layer of the Si substrate could be detected as a change in the surface potential to reproduce the recorded information out of contact with the recording medium.

When a cantilever having a resonant frequency of 1.5 MHz and a sufficiently small spring constant ranging from 0.1 to 3 [N/m] was used, it was possible to detect and reproduce a response signal of a recording bit in a high-frequency range of 1 MHz according to the reproducing apparatus of the KFM configuration.

It can be understood from the foregoing that the arrangement according to Example 18 had sufficient functions for use as a highly packed information recording and reproducing apparatus.

EXAMPLE 19

A recording medium 10 according to Example 19 had a structure shown in FIG. 17. The recording medium 10 had an active layer 13 comprising a ferroelectric layer 73 of Pr(Zr, Ti)O$_3$ (PZT), and a base or buffer layer 9 of CeO$_2$.

The base or buffer layer 9 of CeO$_2$ had the same characteristics and advantages as those of the base layer of SrTiO$_3$ in Example 13.

The PZT had the same characteristics as those described in Example 13 on account of the optimization of the buffer layer.

A layer 9A of SiO$_2$ was formed to a thickness of 10 nm on a substrate 11 of Si by thermal oxidation, and then a layer 9B of CeO$_2$ was evaporated to a thickness of 30 nm on the layer 9A, thereby forming a double-film base or buffer layer 9. An active layer 13 of a PZT ferroelectric material was then deposited to a thickness of 300 nm on the layer 9B of CeO$_2$. The layer 9B of CeO$_2$ served as a substrate crystal for growing the crystal of the PZT ferroelectric film. The grown PZT ferroelectric film had a Perovskite crystal structure, and had a high-density fine grain.

Because the polarization of the recording medium were voltage-dependent, the PZT exhibited hysteresis characteristics inherent in the ferroelectric material. In Example 19, the twofold value (2Pr) of the residual polarization Pr was 40 $\mu$C/cm$^2$, and the coercive voltage is 1.5 V.

In Example 19, information was recorded, erased, and reproduced in the same manner as with Example 13 by the arrangement shown in FIG. 4 and the configuration (i) shown in FIG. 5.

Recording, erasing, and reproducing characteristics in Example 19 will be described below.

First, a DC voltage of +9 V was applied to an area having a size of 3 $\mu$m×3 $\mu$m of the thin film of PZT to orient its spontaneous polarization in one direction. Then, a pulse voltage of −7 V with opposite polarity was applied from the head, i.e., the tip 21 to change the state of the space charge layer caused by spontaneous polarization from the "stored state" to the "depleted state" or vice versa, developing a local distribution of the space charge layer depending on recording information. Then, a distribution of space charge layer differences caused by the direction of the local polarization of the PZT film was detected or reproduced as a distribution of the surface potential by the reproducing apparatus with the SMM configuration (i).

A distribution of the surface potential was evaluated by SMM. As a result, the contrast of an area having a size of 3 $\mu$m×3 $\mu$m was low, indicating that the state of the space charge layer caused by the polarization reversal was reversed into one state, compared with the surrounding area. A bright spot, i.e., a recording bit, was observed in the low-contrast area. This indicated that the state of the space charge layer was made opposite to the surrounding area due to the application of the voltage of −7 V. The state of the space charge layer caused by the direction of polarization was aligned with the direction of an electric field in a local area as a feature of the ferroelectric material. It was possible to overwrite the recorded information. The "stored state" and the "depleted state" of the space charge layer due to the two directions of local polarization may correspond to stored states "0" and "1" of digital data. That is, high and low contrasts areas may correspond to "0" and "1" of digital data for recording highly packed information.

As a result of various experiments, it was confirmed that the diameter of the small recording area or the recording bit could be reduced to 100 nm or less, and that the time required for switching the polarization reversal was smaller than 1 $\mu$s.

It can be understood from the foregoing that the arrangement according to Example 19 had sufficient functions for use as a highly packed information recording and reproducing apparatus.

EXAMPLE 20

Information was recorded on the same recording medium as with Example 19 according to the same recording process as with Example 19. In Example 20, the recorded information was reproduced by the reproducing apparatus of the SMM configuration (ii) combined with the heterodyne detected system.

Recording and erasing characteristics in Example 20 were the same as those in Example 19. Since the recorded information was read according to the SMM configuration (ii) combined with the heterodyne detected system, it was possible to detect and reproduce a response signal of a recording bit based on the difference between electrostatic capacitances in a high frequency range of 10 MHz.

It can be understood from the foregoing that the arrangement according to Example 20 had sufficient functions for use as a highly packed information recording and reproducing apparatus.

EXAMPLE 21

Information was recorded on the same recording medium as with Example 19 according to the same recording process as with Example 19. In Example 21, the recorded information was reproduced by the reproducing apparatus of the KFM configuration (iii).

Recording and erasing characteristics in Example 21 were the same as those in Example 19. Specifically, the diameter of the small recording area or the recording bit could be reduced to 100 nm or less, and the time required for switching the polarization reversal was smaller than 1 μs.

The local area where the polarization was reversed was retained sufficiently stably.

When a cantilever having a resonant frequency of 1.5 MHz and a sufficiently small spring constant ranging from 0.1 to 3 [N/m] was used, it was possible to detect and reproduce a response signal of a recording bit in a high-frequency range of 1 MHz according to the reproducing apparatus of the KFM configuration.

It can be understood from the foregoing that the arrangement according to Example 21 had sufficient functions for use as a highly packed information recording and reproducing apparatus.

EXAMPLE 22

Figure 18:
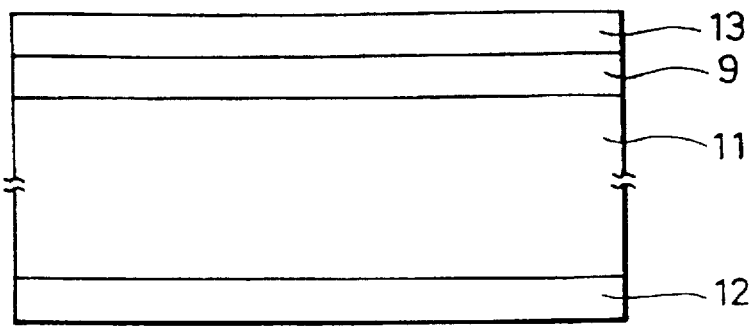
FIG. 18 is a fragmentary cross-sectional view of a recording medium according to another example of the present invention.

In Example 22, a ferroelectric material of a recording medium comprised a Bi laminar compound. The recording medium 10 in Example 22 had a structure shown in FIG. 18. A base or buffer layer 9 of a Bi laminar compound was formed on a substrate 11 of Si, and a Bi laminar compound of SrBiTiO, SrBiTaO, PbSrBiTiO, or BaBiNbO was formed on the base or buffer layer 9. A lower electrode 12 was formed in ohmic contact with the reverse side of the substrate 11.

The Bi laminar compound has excellent fatigue characteristics such that its fatigue is very small even when the polarization reversal is repeated $10^{12}$ times. The twofold value (2Pr) of its residual polarization Pr ranges from 15 to 30 $\mu C/cm^2$, and its coercive voltage is 2 V or less. The recorded data will be retained for 10 years or more at room temperature. Since the time required to rewrite data is proportional to the electrode area, it can be reduced to 1 ns or less by reducing the electrode area. The switching speed is very fast. The Bi laminar compound is highly reliable when data are successively written and thereafter different data are written.

The recording medium 10 was fabricated as follows: a buffer or base layer 9 of SrBiTiO was deposited to a thickness of 30 nm on a substrate 11 of single-crystal Si by sputtering, and then heated in an oxygen atmosphere. The buffer layer 9 thus heated had excellent crystallinity even on the substrate 11 of Si. Then, an active ferroelectric layer 13 of $SrBi_2Ta_2O_9$ was grown to a thickness of 30 nm on the buffer layer 9 by MOCVD. The grown active ferroelectric layer 13 of $SrBi_2Ta_2O_9$ comprised a dense film which was of high density and had a fine grain. The heated buffer layer 9 served as an effective initial nucleus for the film of $SrBi_2Ta_2O_9$ which would be grown thereon.

Because the polarization of the recording medium were voltage-dependent, the $SrBi_2Ta_2O_9$ exhibited hysteresis characteristics inherent in the ferroelectric material. In Example 22, the twofold value (2Pr) of the residual polarization Pr was 20 $\mu C/cm^2$, and the coercive voltage is 0.8 V.

Information was recorded on the recording medium 10 by the arrangement shown in FIG. 4, and the recorded information was reproduced by the reproducing apparatus of the SMM configuration (i) shown in FIG. 5.

Recording, erasing, and reproducing characteristics in Example 22 will be described below.

First, a DC voltage of +9 V was applied to an area having a size of 3 μm×3 μm of the thin film of $SrBi_2Ta_2O_9$ to orient its spontaneous polarization in one direction. Then, a pulse voltage of −7 V with opposite polarity was applied from the head, i.e., the tip 21 to change the state of the space charge layer caused by spontaneous polarization from the "stored state" to the "depleted state" or vice versa, developing a local distribution of the space charge layer depending on recording information. Then, a distribution of space charge layer differences caused by the direction of the local polarization of the $SrBi_2Ta_2O_9$ film was detected or reproduced as a distribution of the surface potential by the reproducing apparatus with the SMM configuration (i).

A distribution of the surface potential was evaluated by SMM. As a result, the contrast of an area having a size of 3 μm×3 μm was low, indicating that the state of the space charge layer caused by the polarization reversal was reversed into one state, compared with the surrounding area. A bright spot, i.e., a recording bit, was observed in the low-contrast area. This indicated that the state of the space charge layer was made opposite to the surrounding area due to the application of the voltage of −7 V. The state of the space charge layer caused by the direction of polarization was aligned with the direction of an electric field in a local area as a feature of the ferroelectric material. It was possible to overwrite the recorded information. The "stored state" and the "depleted state" of the space charge layer due to the two directions of local polarization may correspond to stored states "0" and "1" of digital data. That is, high and low contrasts areas may correspond to "0" and "1" of digital data for recording highly packed information.

As a result of various experiments, it was confirmed that the diameter of the small recording area or the recording bit could be reduced to 100 nm or less. The area of the "stored state" and the "depleted state" of the space charge layer due to the polarization reversal was retained sufficiently stably.

It can be understood from the foregoing that the arrangement according to Example 22 had sufficient functions for use as a highly packed information recording and reproducing apparatus.

EXAMPLE 23

Information was recorded on the same recording medium as with Example 22 according to the same recording process as with Example 22. In Example 23, the recorded information was reproduced by the reproducing apparatus of the SMM configuration (ii) combined with the heterodyne detected system.

Recording and erasing characteristics in Example 23 were the same as those in Example 22. Since the recorded information was read according to the SMM configuration (ii) combined with the heterodyne detected system, it was possible to detect and reproduce a response signal of a recording bit based on the difference between electrostatic interactions in a high frequency range of 10 MHz.

It can be understood from the foregoing that the arrangement according to Example 23 had sufficient functions for use as a highly packed information recording and reproducing apparatus.

EXAMPLE 24

Information was recorded on the same recording medium as with Example 22 according to the same recording process as with Example 22. In Example 24, the recorded information was reproduced by the reproducing apparatus of the KFM configuration (iii).

Recording and erasing characteristics in Example 24 were the same as those in Example 22. Specifically, the diameter of the small recording area or the recording bit could be reduced to 100 nm or less, and the time required for switching the polarization reversal was smaller than 1 µs.

The local area where the polarization was reversed was retained sufficiently stably.

When a cantilever having a resonant frequency of 1.5 MHz and a sufficiently small spring constant ranging from 0.1 to 3 |N/m| was used, it was possible to detect and reproduce a response signal of a recording bit in a high-frequency range of 1 MHz according to the reproducing apparatus of the KFM configuration.

It can be understood from the foregoing that the arrangement according to Example 24 had sufficient functions for use as a highly packed information recording and reproducing apparatus.

The ferroelectric film of SrBiTaO of the base or buffer layer and the active layer in Examples 22~24 was replaced with a ferroelectric film of SrBiNbO, and these modified arrangements exhibited the same characteristics as those in Examples 22~24.

EXAMPLE 25

Figure 19:
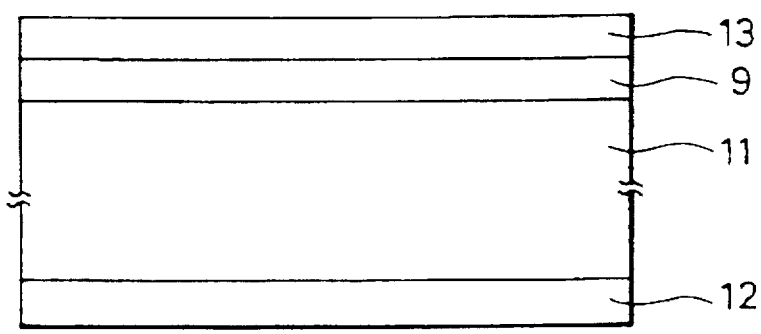
FIG. 19 is a fragmentary cross-sectional view of a recording medium according to still another example of the present invention.

In example 25, the ferroelectric layer of the active layer 13 comprised a thin film of a copolymer of vinylidene fluoride and trifluoroethylene (VDF-TrFE). As shown in FIG. 19, a base layer 9 was formed to a thickness of 20 nm on a principal surface of a substrate 11 of Si by thermal oxidation of the surface of the substrate 11, and then a ferroelectric layer of a copolymer of VDF-TrFE was deposited as an active layer 13 to a thickness of 300 nm on the base layer 9 by vapor deposition of spin coating. The ferroelectric layer of the copolymer of VDF-TrFE contained 50% or more of vinylidene fluoride, and exhibited ferroelectricity. A lower electrode 12 was formed in ohmic contact with the reverse side of the substrate 11.

Information was recorded on the recording medium 10 by the arrangement shown in FIG. 4, and the recorded information was reproduced by the reproducing apparatus of the SMM configuration (i) shown in FIG. 5.

Recording, erasing, and reproducing characteristics in Example 25 will be described below.

First, a voltage of +20 V was applied to an area having a size of 5 µm×5 µm of the ferroelectric film to orient its spontaneous polarization in one direction. Then, a voltage of −10 V was applied to reverse the direction of polarization. A distribution of the directions of polarization was evaluated by SMM. As a result, the contrast of the area having the size of 5 µm×5 µm was low, indicating that the state of the space charge layer caused by the polarization reversal was reversed into the "stored state" or the "depleted state", compared with the surrounding area. A bright spot, i.e., a recording bit, was observed in the low-contrast area. This indicated that the state of the space charge layer was made opposite to the surrounding area due to the application of the voltage of −10 V. The state of the space charge layer caused by the direction of polarization was aligned with the direction of an electric field in a local area as a feature of the ferroelectric material. It was possible to overwrite the recorded information. The "stored state" and the "depleted state" of the space charge layer due to the two directions of local polarization may correspond to stored states "0" and "1" of digital data. That is, high and low contrasts areas may correspond to "0" and "1" of digital data for recording highly packed information.

As a result of various experiments, it was confirmed that the diameter of the small recording area or the recording bit could be reduced to 100 nm or less. The area of the "stored state" and the "depleted state" of the space charge layer due to the polarization reversal was retained sufficiently stably.

It can be understood from the foregoing that the arrangement according to Example 25 had sufficient functions for use as a highly packed information recording and reproducing apparatus.

EXAMPLE 26

Information was recorded on the same recording medium as with Example 25 according to the same recording process as with Example 25. In Example 26, the recorded information was reproduced by the reproducing apparatus of the SMM configuration (ii) combined with the heterodyne detected system.

Recording and erasing characteristics in Example 26 were the same as those in Example 25. Since the recorded information was read according to the SMM configuration (ii) combined with the heterodyne detected system, it was possible to detect and reproduce a response signal of a recording bit based on the difference between electrostatic interactions in a high frequency range of 10 MHz.

It can be understood from the foregoing that the arrangement according to Example 26 had sufficient functions for use as a highly packed information recording and reproducing apparatus.

EXAMPLE 27

Information was recorded on the same recording medium as with Example 25 according to the same recording process as with Example 25. In Example 27, the recorded information was reproduced by the reproducing apparatus of the KFM configuration (iii).

Recording, erasing, and reproducing characteristics in Example 27 were the same as those in Example 25. Specifically, the diameter of the small recording area or the recording bit could be reduced to 100 nm or less, and the time required for switching the polarization reversal was smaller than 1 µs.

The local area where the polarization was reversed was retained sufficiently stably.

When a cantilever having a resonant frequency of 1.5 MHz was used, it was possible to detect and reproduce a response signal of a recording bit in a high-frequency range of 1 MHz according to the reproducing apparatus of the KFM configuration.

It can be understood from the foregoing that the arrangement according to Example 27 had sufficient functions for use as a highly packed information recording and reproducing apparatus.

Examples for recording and erasing information by way of transport of electric charges will be described below.
Recording and erasing of information by way of transport of electric charges A recording medium 10 which is used is of the structure shown in FIG. 3. The active layer 13 comprises a charge storage layer. The charge storage layer comprises at least two hetero layers, and at least one of hetero interfaces or layers having a region where carrier traps, i.e., electron or hole traps are present in a highly packed condition. Electrons or holes, i.e., electric charges, move into the region of carrier traps for thereby recording or erasing information.

A substrate 11 is made of conductive silicone (Si), and an active layer 13 comprising a charge storage layer in the form of at least two hetero layers jointly making up a hetero interface is formed on the substrate 11. The charge storage layer comprises at least two hetero layers of silicon oxide (SiO), silicon nitride (SiN), aluminum nitride (AlN), aluminum oxide ($Al_2O_3$), tantalum oxide ($Ta_2O_5$), titanium oxide ($TiO_2$), or the like, which jointly provide a $SiO_2$/SiN hetero interface, a $SiO_2$/AlN hetero interface, a $SiO_2$/$Al_2O_3$ hetero interface, a $SiO_2$/$Ta_2O$ hetero interface, $SiO_2$/$TiO_2$ hetero interface, or the like. A lower electrode 12 is formed in ohmic contact with the reverse side of the substrate 11.

Information is recorded on the recording medium 10 by the AFM arrangement shown in FIG. 4. Specifically, the recording head comprises an AFM-controlled conductive cantilever having a tip on its distal end.

For recording information on the recording medium 10 having the active layer 13 in the form of a charge storage layer, a recording voltage $V_R$ whose absolute value is $|V_R| \leq 20$ V, e.g., a negative pulse voltage of −10 V, is applied to the conductive cantilever of the recording head HR with the tip on the distal end, for thereby introducing a carrier (electrons in this case) from the tip into local carrier traps in the charge storage layer such as the $SiO_2$/SiN hetero interface or the $SiO_2$/AlN hetero interface and also into carrier traps in the hetero layers to record information.

For erasing the information thus recorded by introducing the charges into the carrier traps, a positive pulse voltage of +9 V, for example, is applied to discharge the charges (electrons in this case) to restore the carrier traps in the charge storage layer such as the $SiO_2$/SiN hetero interface or the $SiO_2$/AlN hetero interface and the carrier traps in the hetero layers (hereinafter referred to as carrier traps near hetero junction traps) for thereby erasing the recorded information.

Therefore, information is recorded and erased by moving electric charges into and out of carrier traps near hetero junction traps.

In the above recording and erasing mode, it is possible to overwrite previously recorded information with new information on the recording medium 10, without the need for separately erasing the previously recorded information prior to the overwrite process.

Information may be recorded and erased with an operating voltage lower than 20 V or less. However, the operating voltage may be lower than 10 V if the materials of the recording medium and the thicknesses of the layers thereof are selected. Furthermore, the time required to introduce the carrier into the carrier traps in the charge storage layer may be reduced to 1 ns or shorter by selecting the thickness of the hetero layer of $SiO_2$ or the like through which the carrier tunnels.

The diameter of a recording area may be selected to be in the range from 50 nm to 100 nm, allowing highly packed information to be recorded, erased, and reproduced.

The information recorded in the above recording mode can be read or reproduced by the reproducing apparatus of any one of the configurations (i)~(iii) described above.

Examples of apparatus for recording and reproducing information by way of transport of electric charges will be described below.

EXAMPLE 28

Figure 20:
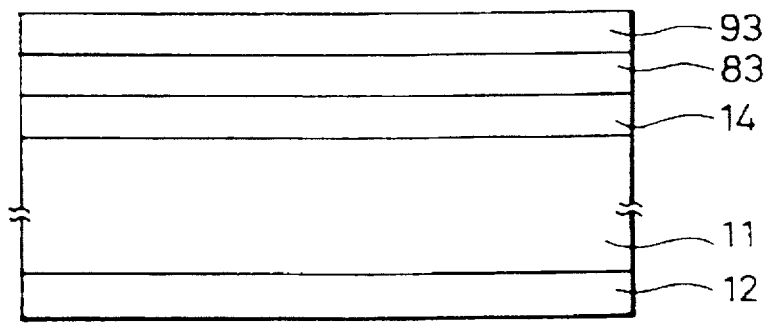
FIG. 20 is a fragmentary cross-sectional view of a recording medium according to yet still another example of the present invention.

A recording medium 10 according to Example 28 had a structure shown in FIG. 20. An insulating layer 14 of $SiO_2$ having a thickness of 2 nm was formed on an n-type substrate 11 of Si by thermal oxidation of the surface of the substrate 11. A SiN layer 83 having a thickness of 10 nm was formed on the insulating layer 14 by LPCVD, and the surface of the SiN layer 83 was thermally oxidized to form a $SiO_2$ layer 93 having a thickness of 5 nm. A lower electrode 12 was formed on the reverse side of the Si substrate 11.

Information can be recorded on the recording medium 10 by transport of electric charges between the Si substrate and carrier traps near a $SiO_2$/SiN hetero interface.

Information was recorded by the AFM recording apparatus shown in FIG. 4.

Specifically, the recording head, i.e., the tip 21 was held in contact with the $SiO_2$ layer 93, and the support base 30 was moved to scan the tip 21 thereover. At the same time, a voltage was applied between the tip 21 and the lower electrode 12 with a positive potential being applied to the recording head HR, causing electrons to flow from the substrate 11 and tunnel through the $SiO_2$ layer 14 under the intensive electric field. The electrons were then introduced into carrier traps present in the SiN layer 83, the interface between the $SiO_2$ layer 14 and the SiN layer 83, and the interface between the SiN layer 83 and the $SiO_2$ layer 93, and stored in the carrier traps.

Conversely, when a voltage was applied with a negative potential imposed on the recording head HR, the electrons trapped in the carrier traps near the $SiO_2$/SiN hetero interface were caused to tunnel through the $SiO_2$ layer 14 under the inverse intensive electric field and were discharged, with the result that the carrier traps near the $SiO_2$/SiN interface are depleted of electrons. In this manner, information is recorded and erased by the transport of electric charges upon application of a pulse voltage.

The recorded information is reproduced by electrically reading a distribution of the surface potential Vs depending on whether there are electrons trapped in the carrier traps or not, with the reproducing apparatus of the SMM configuration (i) out of contact with the recording medium.

Recording, erasing, and reproducing characteristics in Example 28 will be described below.

First, a pulse voltage of 9 V was applied to the $SiO_2$/SiN/$SiO_2$/Si structure of the recording medium from the head, i.e., the tip 21 to introduce electrons into local carrier traps near hetero junctions.

The difference between amounts of introduced electric charges was detected as a distribution of the surface potential Vs by the reproducing apparatus of the SMM configuration shown in FIG. 5. An evaluation with SMM showed that the surface topography was not changed after the pulse voltage was applied, and the surface of the recording medium remained unchanged and was kept in a good condition when the pulse voltage was applied.

Figure 21:
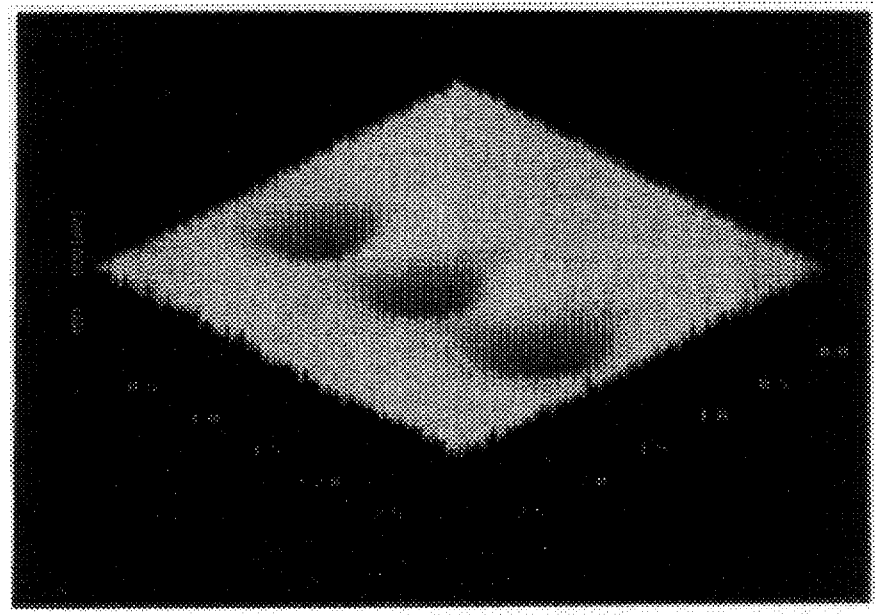
FIGS. 21 and 22 are diagrams showing intermediate-tone images, displayed on a display unit, of surface topography distributions and surface potential distributions, observed by a scanning Maxwell stress microscope, of recorded states of the recording medium shown in FIG. 20.

FIG. 21 shows a surface potential distribution in an area of 3 µm×3 µm as measured by a typical type of SMM. In FIG. 21, three different areas are observed which have a lower contrast and a lower surface potential than the surrounding area, each of the three different areas being produced by applying a pulse voltage of +9 V once thereto. Each of the three different areas corresponds to a local area where electrons were introduced. It is therefore found out that three bits of information could be recorded and reproduced as designed.

Figure 22:
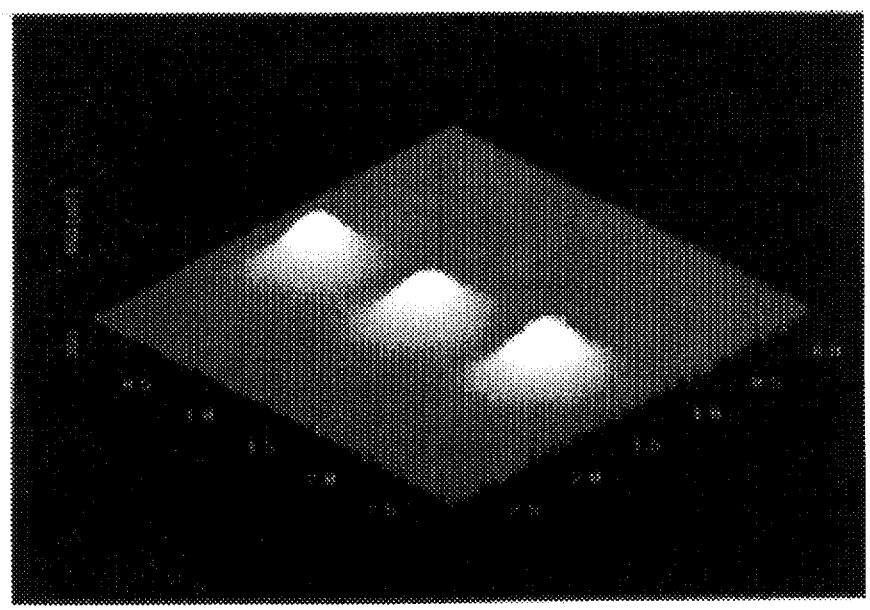

FIG. 22 shows a surface potential distribution in an area of 3 µm×3 µm produced when a pulse voltage of −9 V was applied to each of different three areas to discharge electrons or introduce holes. In FIG. 22, areas are observed which have a higher contrast and a higher surface potential than the surrounding area. Each of these areas corresponds to a local area where electrons are discharged toward the substrate 11 or holes are introduced from the substrate 11. It is therefore found out that three bits of information could be recorded and reproduced as designed.

The surface potential of any area shown in FIG. 22 from which electrons were discharged or into which holes were introduced is higher than the surrounding area compared with the surface potential shown in FIG. 21. It is clearly seen that the introduced carriers have opposite signs in FIGS. 21 and 22.

The scanning area of SMM was reduced to a size of 1.5 µm×1.5 µm, for example, and the same experiment as described above was conducted. As a result, a pattern of recorded bits represented by surface potentials due to introduced or discharged electrons was observed.

The difference between the potential of a recorded bit produced by introduced electric charges and a surface potential in a surrounding area was about 50 mV. Since the potential resolution of SMM was 1 mV, it was found out that the potential differential was of a value sufficiently large to differentiate the data of "0" and "1" of digital signals.

When a voltage of −9 V was applied to an area of the recording medium and thereafter a pulse voltage of +9 V was applied thereto, the surface potential of the area was substantially equalized to the surrounding area, indicating that the trapped carriers were eliminated. This process showed that recorded bits can be erased.

It was found out that the recorded information can be overwritten by controlling the conditions of voltage pulses.

Accordingly, it was recognized that the amount of electric charges introduced from the Si substrate into local carrier traps in the recording medium could be controlled by the application of a bias voltage from the recording head, i.e., the cantilever.

The presence and absence of local electric charges may correspond to stored states "0" and "1" of digital data. That is, high and low contrasts areas may correspond to "0" and "1" of digital data for recording highly packed information.

As a result of various experiments, it was confirmed that the diameter of the minimum recording bit could be reduced to 100 nm or less, and that time required to switch the introduction of a carrier was smaller than 1 µs.

The local area where a carrier was introduced was retained sufficiently stably.

It can be understood from the foregoing that the arrangement according to Example 28 had sufficient functions for use as a highly packed information recording and reproducing apparatus.

The laminar structure of the recording medium in Example 28 is different from the NOS structure reported by Mr. Quate, et al. Therefore, it is possible to use an operating voltage of 10 V or less for recording and erasing information. Data are written in the recording medium by applying a pulse voltage of +9 V, and reproduced by reading a local charge trap area as a surface potential difference measured by SMM.

The $SiO_2/SiN/SiO_2/Si$ structure of the recording medium in Example 28 includes two $SiO_2/SiN$ hetero interfaces. Therefore, when a carrier is introduced from the substrate 11, the carrier is blocked by the upper hetero interface, reducing the probability of a carrier passage through the carrier trap. The carrier can thus be introduced efficiently into the carrier trap for recording information. Stated otherwise, the recording sensitivity and the reproducing output can be increased, and hence the operating voltage and the electric power consumption can be reduced.

EXAMPLE 29

In Example 29, the same recording medium having the $SiO_2/SiN/SiO_2/Si$ structure as with Example 28 was used, and information was recorded in the same manner as with Example 28. The recorded information was reproduced by the reproducing apparatus of the SMM configuration (ii) combined with the heterodyne detected system.

Recording, erasing, and reproducing characteristics in Example 29 will be described below.

First, a pulse voltage of 9 V was applied to the $SiO_2/SiN/SiO_2/n$-Si structure of the recording medium 10 from the head, i.e., the tip 21 to introduce electrons into local carrier traps near hetero junctions. The difference between amounts of introduced electric charges was detected as a distribution of the surface potential Vs. The SMM configuration (ii) combined with the heterodyne detected system was used to detect an electrostatic capacitance distribution in a high frequency range of 10 MHz.

An electrostatic capacitance distribution in an area having a size of 3 µm×3 µm of an SMM image produced by the heterodyne detected system was reviewed. As a consequence, it was found out that the reviewed electrostatic capacitance distribution was the same as a surface potential distribution in a frequency range from 5 to 20 kHz evaluated by the ordinary SMM measurements. In the SMM image, the contrast of an area from which electrons were discharged or holes were introduced was higher than the surrounding area. An evaluated electrostatic capacitance distribution in a high frequency range of 10 MHz was the same as the surface potential distribution in a frequency range from 5 to 20 kHz which is a normal measurement frequency range. This indicates that recording bits can be detected in the high frequency range of 10 MHz. The potential difference between the amount of introduced charges, e.g., discharged electrons or introduced holes (peak) and a surface potential in a surrounding area was about 50 mV. Since the potential resolution of SMM was 1 mV, it was found out that the potential differential was of a value sufficiently large to differentiate the data of "0" and "1" of digital signals.

Recording and erasing characteristics in Example 29 are the same as those in Example 28. Since the recorded information was read according to the SMM configuration (ii) combined with the heterodyne detected system, it was possible to detect and reproduce a response signal of a recording bit based on the difference between electrostatic interactions in a high frequency range of 10 MHz.

EXAMPLE 30

Using the same recording medium having the $SiO_2/SiN/SiO_2/Si$ structure as with Example 28, information was recorded by the same recording apparatus as with Example 28.

First, a pulse voltage of +9 V was applied to the $SiO_2/SiN/SiO_2/Si$ structure (hereinafter referred to as a material 1) of the recording medium from the head, i.e., the tip 21 to introduce electrons into local carrier traps near hetero junctions. The difference between local amounts of introduced electric charges was detected as a distribution of differentials of the surface potential Vs by the KFM reproducing apparatus shown in FIG. 7. An evaluation of an area having a size of 3 µm×3 µm with KFM indicated that no change was observed of the surface topography after the pulse voltage was applied, and the surface of the recording medium remained unchanged and was kept in a good condition when the pulse voltage was applied.

In the KFM image, the contrast of an area where the carrier was introduced in the area having the size of 3 μm×3 μm was lower than the surrounding area, indicating that electrons were introduced from the Si substrate into a local area near the hetero junction upon the application of the voltage of +9 V, increasing the amount of negative charges compared with the surrounding area thereby to lower the surface potential. The scanning area of KFM was reduced to a size of 1.5 μm×1.5 μm, for example, and the same experiment as described above was conducted. As a result, one recording bit whose amount of electric charges was increased by the introduction of an electron carrier was detected.

It was understood from the foregoing that a minute recording bit can be detected and reproduced by KFM.

The difference between the amounts of introduced electric charges was about 50 mV. Since the potential resolution of KFM was 3 mV, it was found out that the potential differential was of a value sufficiently large to differentiate the data of "0" and "1" of digital signals.

When a voltage of −9 V, i.e., a voltage of opposite polarity to that in the above experiment, was applied to the recording medium, the contrast of an image observed as a potential distribution by KFM was also reversed. This process showed that recorded bits can be erased.

When a cantilever having a resonant frequency of 1.5 MHz and a sufficiently small spring constant ranging from 0.1 to 3 [N/m] was used, it was possible to detect and reproduce a response signal of a recording bit in a high-frequency range of 1 MHz according to the reproducing apparatus of the KFM configuration.

It can be understood from the foregoing that the arrangement according to Example 30 had sufficient functions for use as a highly packed information recording and reproducing apparatus.

EXAMPLE 31

In Example 31, electrons are introduced from the cantilever into carrier traps in the charge storage layer of the recording medium to record information.

The recording medium 10 had a $SiO_2$ film 14 having a thickness of 4 nm and a SiN film 15 having a thickness of 10 nm which were formed on a Si substrate 11 by thermal oxidation and low-pressure (LP) VCD, respectively. A $SiO_2$ film 16 having a thickness of 3 nm was formed on the SiN film 15 by thermal oxidation.

Information was recorded on the recording medium by the recording head HR shown in FIG. 4. Specifically, while the recording medium 10 is being scanned by the tip 21, a pulse voltage based on recording information was applied to introduce electrons from the conductive cantilever into a local carrier trap near a hetero interface such as a $SiO_2$/SiN interface for thereby recording the information. A recording pattern was thus formed on the basis of the recording information depending on the presence and absence of a carrier (electrons) introduced into local carrier traps.

In Example 31, electrons are introduced from the conductive cantilever into a local carrier trap near a hetero interface between the $SiO_2$ layer and the SiN to develop a local difference between amounts of electric charges, and the local difference between amounts of electric charges is detected as a distribution of the surface potential Vs.

The recording medium had voltage vs. capacitance characteristics which are the same as the polarization vs. voltage characteristics shown in FIG. 14. The voltage vs. capacitance characteristics plotted when electric charges are introduced into traps in the recording layer are different from the voltage vs. capacitance characteristics plotted when electric charges are not introduced into traps in the recording layer. As a result, the voltage vs. capacitance characteristics exhibit hysteresis characteristics depending on whether there are introduced electric charges or not.

The difference ΔV between bias voltages in the hysteresis characteristics depends on the amount of introduced electric charges, and is larger as the amount of introduced electric charges is greater. The hysteresis characteristics are such that with the bias voltage being constant, the capacitance varies depending on whether there are introduced electric charges or not. Therefore, information can be recorded and reproduced by detecting a spatial capacitance change as a change in the surface potential out of contact with the recording medium.

Figure 23:
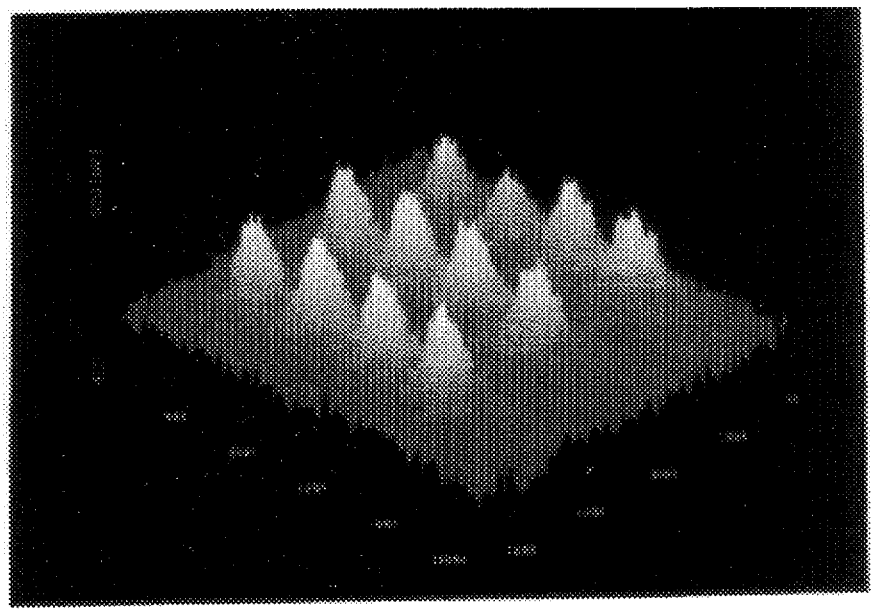
FIG. 23 is diagram showing an intermediate-tone, displayed on a display unit, of a surface topography distribution and a surface potential distribution, observed by a scanning Maxwell stress microscope, of a recorded state of a recording medium according to a further example of the present invention.

FIG. 23 shows a surface potential distribution representing a two-dimensional array of recording areas produced when electrons were discharged or holes were introduced by the application of a pulse voltage of +9 V. In FIG. 23, a pattern of 4×3=12 recording bits was successively produced. It was also confirmed that the recording bits could be erased by applying a voltage pulse of opposite polarity.

In Example 31, the difference between the amounts of introduced electric charges was about 50 mV. Since the potential resolution of SMM was 1 mV, it was found out that the potential differential was of a value sufficiently large to differentiate the data of "0" and "1" of digital signals.

When a voltage of −9 V, i.e., a voltage of opposite polarity to that in the above experiment, was applied to the recording medium, the contrast of an image observed as a potential distribution by SMM was also reversed. This indicated that the carrier introduced into the carrier traps was of opposite polarity. It was also recognized that the recording medium had an overwrite capability.

Accordingly, it was recognized that the amount of electric charges introduced into local carrier traps in the recording medium could be controlled by the application of a bias voltage from the recording head, i.e., the cantilever.

The presence and absence of local electric charges may correspond to stored states "0" and "1" of digital data. That is, high and low contrasts areas may correspond to "0" and "1" of digital data for recording highly packed information.

As a result of various experiments, it was confirmed that the diameter of the minimum recording bit could be reduced to 100 nm or less, and that time required to switch the introduction of a carrier was smaller than 1 μs.

The local area where a carrier was introduced was retained sufficiently stably.

It can be understood from the foregoing that the arrangement according to Example 31 had sufficient functions for use as a highly packed information recording and reproducing apparatus.

EXAMPLE 32

Information was recorded on the same recording medium as with Example 31 by the same recording apparatus as with Example 31. In Example 32, the recorded information was reproduced by the reproducing apparatus of the SMM configuration (ii) combined with the heterodyne detected system.

Recording and erasing characteristics in Example 32 were the same as those in Example 31. Since the recorded information was read according to the SMM configuration (ii) combined with the heterodyne detected system, it was possible to detect and reproduce a response signal of a recording bit based on the difference between electrostatic interactions in a high frequency range of 10 MHz.

EXAMPLE 33

Information was recorded on the same recording medium as with Example 31 by the same recording apparatus as with Example 31. In Example 33, the recorded information was reproduced by the reproducing apparatus of the KFM configuration (iii).

Recording and erasing characteristics in Example 33 were the same as those in Example 31.

When a cantilever having a resonant frequency of 1.5 MHz and a sufficiently small spring constant ranging from 0.1 to 3 [N/m] was used, it was possible to detect and reproduce a response signal of a recording bit in a high-frequency range of 1 MHz according to the reproducing apparatus of the KFM configuration.

The $SiO_2/SiN/SiO_2$ structure of the recording medium in which the active layer comprised the charge storage layer in Example 33 includes two $SiO_2/SiN$ hetero interfaces. Therefore, when a carrier is introduced from the substrate 11, a barrier presented by the lower $SiO_2$ layer is effective to introduce the carrier into carrier traps in the interfaces and the layers such as the SiN layer. By selecting the film thickness of the $SiO_2$, SiN layers, it is possible to trap the carrier effectively in all the hetero interfaces. Furthermore, if the upper $SiO_2$ layer is formed by thermal CVD, then the formation of carrier traps can be controlled to increase the amount of the carrier into the carrier trap in the charge storage layer. As a result, the recording sensitivity and the reproducing output can be increased, and hence the operating voltage and the electric power consumption can be reduced.

Each of the hetero interfaces is not limited to the $SiO_2/SiN$ hetero interface, but may be any of various other hetero interfaces. The hetero interfaces may comprise three or more superposed hetero interfaces, e.g., $SiO_2/SiN/SiO_2/SiN/SiO_2$ ..., $SiO_2/AlN/SiO_2/AlN/SiO_2$ ..., or the like for increasing carrier traps in the structure of the recording medium which maintains a low operating voltage. Consequently, the amount of an introduced carrier can be increased, resulting in improved recording and reproducing characteristics.

Alternatively, a single hetero interface may be employed. In this case, the hetero interface is provided joined by layers each having many carrier traps. An example directed to such a structure will be described below.

EXAMPLE 34

Figure 24:
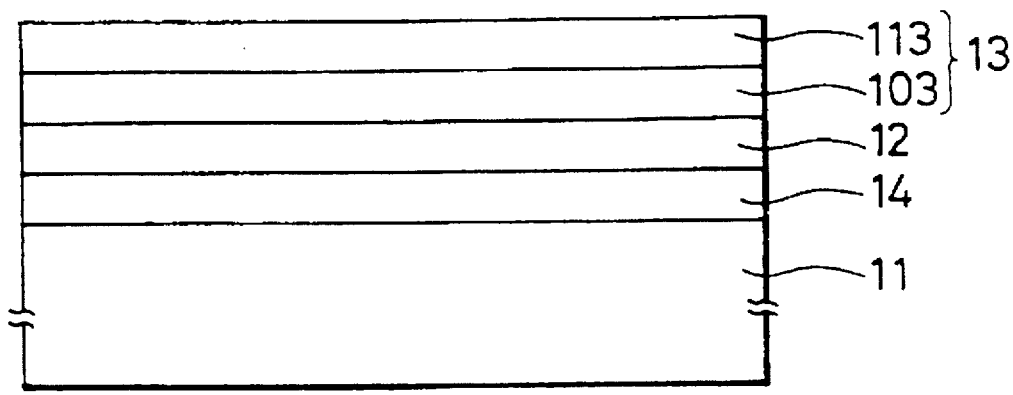
FIG. 24 is a fragmentary cross-sectional view of a recording medium according to a still further example of the present invention.

In Example 34, a recording medium 10 had a structure shown in FIG. 24. An insulating layer 14 of $SiO_2$ was formed on a substrate 11 of n-Si by oxidation of the surface of the substrate 11, and a lower electrode 12 of Pt was then formed on the insulating layer 14. An active layer 13 composed of a $SiO_2$ film 103 and an Alq3 film 113 for recording information was then deposited on the lower electrode 12.

The Alq3 film was made of a material represented by the following chemical formula:

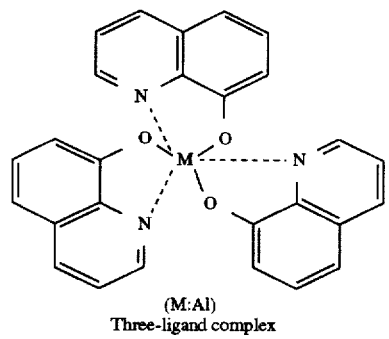

(M:Al)
Three-ligand complex

In Example 34, information was recorded on the recording medium 10 by the arrangement shown in FIG. 4, and the recorded information was reproduced by the reproducing apparatus of the SMM configuration (i) shown in FIG. 5.

Specifically, for recording information, a pulse voltage of +10 V was applied between the recording head, i.e., the conductive cantilever 22 or tip 21, and the lower electrode 12 to introduce electrons into carrier traps in a $SiO_2$/Alq3 interface between the $SiO_2$ film 103 and the Alq3 film 113. For erasing the recorded information, a voltage of opposite polarity was applied to discharge the electrons from the carrier traps in the $SiO_2$/Alq3 interface toward the cantilever 22. The recorded information was reproduced by the reproducing apparatus of the SMM configuration (i) to read a change in the surface potential Vs due to a distribution of electric charges introduced into the local carrier traps, out of contact with the recording medium 10.

The presence and absence of local electric charges present in the carrier traps in the $SiO_2$/Alq3 interface may correspond to stored states "0" and "1" of digital data. It was found out that the potential difference between the data "0" and "1" was sufficiently large with respect to the detecting sensitivity of SMM. It was confirmed that the diameter of the recording bit could be reduced to 100 nm or less.

The local area where electric charges were introduced was retained sufficiently stably.

It can be understood from the foregoing that the arrangement according to Example 34 had sufficient functions for use as a highly packed information recording and reproducing apparatus.

EXAMPLE 35

Information was recorded and erased on the same recording medium as with Example 34 by the same recording and erasing apparatus as with Example 34. In Example 35, the recorded information was reproduced by the reproducing apparatus of the SMM configuration (ii) combined with the heterodyne detected system.

Recording and erasing characteristics in Example 35 are the same as those in Example 34. Since the recorded information was read according to the SMM configuration (ii) combined with the heterodyne detected system, it was possible to detect and reproduce a response signal of a recording bit based on the difference between electrostatic interactions in a high frequency range of 10 MHz.

EXAMPLE 36

Information was recorded on the same recording medium as with Example 34 by the same recording apparatus as with Example 34. In Example 36, the recorded information was reproduced by the reproducing apparatus of the KFM configuration (iii).

Recording and erasing characteristics in Example 36 are the same as those in Example 34. When a cantilever having a resonant frequency of 1.5 MHz and a sufficiently small spring constant ranging from 0.1 to 3 [N/m] was used, it was possible to detect and reproduce a response signal of a recording bit based on the difference between electrostatic interactions in a high frequency range of 10 MHz according to the reproducing apparatus of the KFM configuration.

In Examples 34~36, the Alq3 layer was used as a thin-film trap layer. However, the thin-film trap layer may comprise a polymeric material layer, a charge storage layer such as of amorphous Si or the like which has sufficient carrier traps near a hetero interface, or any of various other material layers.

It is preferable to provide a buffer layer for efficiently moving electric charges between the recording medium and the tip 21 of the cantilever, on the SiO₂ layer, serving as the charge storage layer, on the surface of each of the above recording mediums. An example directed to such a structure will be described below.

EXAMPLE 37

Figure 25:
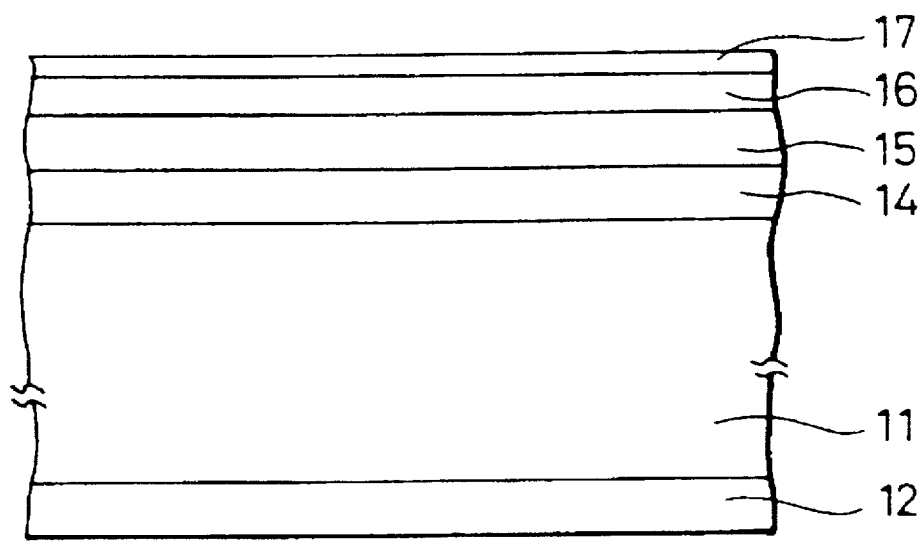
FIG. 25 is a fragmentary cross-sectional view of a recording medium according to a yet still further example of the present invention.

A recording medium 10 in Example 37 was of a structure shown in FIG. 25. An insulating film 14 of SiO₂ having a thickness of 4 nm was formed on an n-type Si substrate 1 by thermal oxidation of a surface of the n-type Si substrate 1, and a SiN film 15 having a thickness of 10 nm and a SiO₂ film 16 having a thickness of 3 nm were successively deposited on the insulating film 14 by thermal CVD. Thereafter, a buffer layer 17 comprising a WSI film was deposited on the SiO₂ film 16 by sputtering. A lower electrode 12 was deposited on the reverse side of the Si substrate 11.

Information is recorded on and reproduced from the recording medium 1 by the transport of electric charges between the conductive cantilever and carrier traps near an SiO₂/SiN hetero interface.

In Example 37, information may be recorded on the recording medium by the recording apparatus shown in FIG. 4, and the recorded information may be reproduced by the reproducing apparatus of any one of the configurations (i)~(iii).

Specifically, when a voltage is applied between the recording head, i.e., the tip 21, and the lower electrode 12, with a negative potential imposed on the recording head, electrons are introduced from the cantilever and caused to tunnel through the SiO₂ film 16 under the intensive electric field, and are stored in the carrier traps near the SiO₂/SiN hetero interface.

Conversely, when a voltage is applied with a positive potential imposed on the recording head, the electrons trapped in the carrier traps near the SiO₂/SiN hetero interface are discharged under the inverse intensive electric field, with the result that the carrier traps near the SiO₂/SiN interface are depleted of electrons. In this manner, information is recorded and erased by the transport of electric charges upon application of a pulse voltage.

Since the buffer layer 17 of WSi was formed, the WSi was interposed between the tip 21 and the SiO₂ film, the WSi having a forbidden band which is intermediate between the respective forbidden bands of the tip 21 and the SiO₂ film. Therefore, the discontinuity between the forbidden bands at the hetero interfaces between the buffer layer 17, the tip 21, and the SiO₂ film was reduced, so that electrons could be introduced from the cantilever into the carrier traps at a lower voltage.

The recorded information is reproduced by electrically reading a distribution of the surface potential Vs based on whether there are trapped electrons or not, with any one of the above configurations (i)~(iii) out of contact with the recording medium.

Data were written in the recording medium 10 by applying an electric pulse of +10 V, and the written data were reproduced by reading the trapped charges in a local carrier trap as a change in the electrostatic capacitance with the SMM configuration combined with the heterodyne detected system.

The presence and absence of local electric charges in the carrier traps near the SiO₂/SiN hetero interface may correspond to stored states "0" and "1" of digital data.

It was found out that the potential differential between the presence and absence of local electric charges was of a value sufficiently large to differentiate the data of "0" and "1" of digital signals.

It was confirmed that the diameter of the minimum recording bit could be reduced to 100 nm or less.

The local area where the state of local electric charges was reversed was retained sufficiently stably.

It can be understood from the foregoing that the arrangement according to Example 37 had sufficient functions for use as a highly packed information recording and reproducing apparatus.

EXAMPLE 38

In Example 38, the active layer 13 of the recording medium 10 has one hetero junction. Specifically, in Example 38, an SiO₂ layer having a thickness of 4 nm and an active layer 13 comprising an SiN layer having a thickness of 20 nm were formed on an n-type Si substrate 11 in the arrangement shown in FIG. 3.

Information is recorded and erased by applying a pulse voltage between the cantilever 22 and the electrode 12 of the recording layer with the recording apparatus shown in FIG. 4 to introduce electric charges and discharging electric charges from local carrier traps near the SiO₂/SiN hetero interface.

The recorded information, i.e., recording bits produced by introducing electric charges into local carrier traps, can be reproduced from the recording medium by the reproducing apparatus of any of the configurations (i)~(iii) while the reading head HP is being kept out of contact with the recording medium.

EXAMPLE 39

In Example 39, the recording and erasing head HR and the reading head HP were separate from each other in each of Examples 1~38. Specifically, in each of Examples 1~38, the recording head HR and the cantilever of the reading head HP were constructed independently of each other. The tipes of those recording and reading heads HR which were used in contact with the recording medium had a relatively thick conductive layer on their surface for wear resistance and also had a radius of curvature ranging from 50 to 100 nm on their tip ends. The tip of the reading head HP used out of contact with the recording medium had a relatively thin conductive layer on its surface because it was not required to be wear-resistant, and had a radius of curvature of 30 nm or less on its tip end, which was smaller than that of the recording and reading heads HR.

Since the radius of curvature of the tip end of the tip of the reading head was reduced, the spatial resolution of the surface potential could be increased when the recorded information was reproduced. Therefore, it was possible to reduce the size of the minimum recording area to a diameter of 60 nm or smaller.

EXAMPLE 40

In Example 40, the recording medium comprised a disk and information was recorded on and reproduced from the recording medium while it was being rotated in each of Examples 1–39. Two recording and reading heads as with Example 39 were employed.

It was possible to confirm information recording and reproducing characteristics as with various Examples described above. Since the reading head was held out of contact with the recording medium for reproducing recorded information, any friction and wear between the head and the recording medium was minimized even when the recording medium was rotated at high speeds. Since the reproducing apparatus of the SMM configuration combined with the heterodyne detected system or the KFM configuration was employed, when a cantilever (head) having a sufficiently high resonant frequency and a sufficiently low spring constant was used, it was possible to reproduce recording bits at high speeds in a high-frequency range.

As a result of various experiments, it was confirmed that the diameter of the minimum recording area could be reduced to 100 nm or less. The time required to switch the recording cycle was smaller than 1 μs. The local area where electric charges were introduced was retained sufficiently stably.

It can be understood from the foregoing that the arrangement according to Example 40 had sufficient functions for use as a highly packed information recording and reproducing apparatus.

In all of Examples 1–40 described above, it is preferable to cover the uppermost surface of the recording medium with a protective layer (not shown) of diamond-like carbon or the like. The protective layer increases the reliability of the recording and reproducing apparatus and the recording medium.

As described above, the recording and reproducing apparatus according to the present invention is capable of increasing the recording density and the speed at which information is recorded and reproduced. The recording and reproducing apparatus according to the present invention can achieve a recording density that is one figure greater than the conventional recording and reproducing apparatus.

While the recording and reading heads have a tip in the present invention, an insulating member may be disposed around the tip for increasing the mechanical strength of the tip. Other changes and modifications may be made to the illustrated arrangements of the present invention.

If the recording and reading heads HR, HP are provided by a common head, then the head may be of a multi-head structure which has a plurality of cantilevers. If the recording and reading heads HR, HP are separate from each other, then one or both of the recording and reading heads HR, HP may also be of a multi-head structure which has a plurality of cantilevers.

While the conductive Si substrate comprised an n-type Si substrate in each of above Examples, it may comprise a p-type Si substrate.

The recording and reproducing apparatus according to the present invention may be capable of both recording and reproducing information, or only reproducing information recorded according to the recording process described above.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A recording and reproducing apparatus for recording and/or reproducing information on a recording medium having an active layer being a ferroelectric layer or a hetero charge storage layer having a carrier trap therein with a head having a tip, comprising:

means for recording and/or erasing information by way of a polarization reversal or transport of electric charges in a predetermined area of the active layer in response to application of a pulse voltage from a recording head, said means for recording and/or erasing comprising a scanning tunnel microscope apparatus, said means for recording and/or erasing information also comprising means for recording the information in said recording medium while holding said head in contact with said recording medium; and means for detecting the information recorded in said predetermined area with a reproducing head without contacting the recording medium as a change in the amount of electric charges or an electrostatic capacitance or a surface potential or their differential in said predetermined area for reproducing the information.

2. A recording and reproducing apparatus according to claim 1, wherein said ferroelectric medium is made of lead zirconate titanate.

3. A recording and reproducing apparatus according to claim 1, wherein said ferroelectric medium is made of a bismuth laminar compound.

4. A recording and reproducing apparatus according to claim 1, wherein said ferroelectric layer is made of a polymeric ferroelectric material.

5. A recording and reproducing apparatus according to claim 1, wherein said charge storage layer includes a hetero interface having a carrier trap and a hetero layer having a carrier trap.

6. A recording and reproducing apparatus according to claim 1, wherein said charge storage layer includes a silicon oxide layer and a silicon nitride layer which are mounted on a conductive silicon substrate.

7. A recording and reproducing apparatus according to claim 6, wherein said recording medium has a surface made of a material having a forbidden band which is intermediate between forbidden band gap energies of a surface metal material of said tip and said silicon oxide layer.

8. A recording and reproducing apparatus according to claim 1, wherein said recording medium includes a molecular material layer capable of transporting electrons or holes.

9. A recording and reproducing apparatus according to claim 1, wherein said recording medium includes a protective layer on an uppermost surface thereof.

10. The apparatus of claim 1, wherein the means for detecting the information recorded in the recording medium comprises a scanning Maxwell stress microscope apparatus.

11. The apparatus of claim 1, wherein the means for detecting the information recorded in the recording medium comprises a heterdyne detection system with a scanning Maxwell stress microscope apparatus.

12. The apparatus of claim 1, wherein the means for detecting the information recorded in the recording medium comprises a Kelvin force microscope apparatus.

13. The recording and reproducing apparatus according to claim 1, 10, 11 or 12, wherein the recording and reproducing heads comprise a common head for recording and reproducing the information.

14. A recording and reproducing apparatus according to claim 1, 10, 11 or 12, wherein the recording and reproducing heads comprise a recording head for recording the information and a separate reading head for reproducing the information.

15. A recording and reproducing apparatus according to claim 1, 10, 11 or 12, wherein said means for recording and/or erasing information comprises means for applying a pulse voltage of at most 20 V to said head, said recording medium having a unit recording area having a diameter of less than 100 nm.

16. A recording and reproducing apparatus according to claim 1, 10, 11 or 12, wherein said recording medium has a unit recording area, and the information is recorded in and reproduced from the unit recording area at a speed of 1 μs.

17. A recording and reproducing apparatus according to claim 1, 10, 11 or 12, wherein said means for detecting the information comprises means for detecting the change in the electric charges or the electrostatic capacitance or the surface potential in said predetermined area at a high speed at a frequency higher than a resonant frequency of said head according to a heterodyne detecting process.

18. A recording and reproducing apparatus according to claim 1, 10, 11 or 12, wherein said means for detecting the information comprises means for detecting the change in the electric charges or the electrostatic capacitance or the surface potential in said predetermined area or a differential thereof as a change in amplitude or phase at a resonant point due to a shift of a resonant frequency of said head.

19. A recording and reproducing apparatus according to claim 1, 10, 11 or 12, wherein the information is recorded on or reproduced from said recording medium while said recording medium is being rotated.

20. The apparatus of claim 1, 10, 11 or 12, wherein said means for recording the information in said recording medium while holding said recording head in contact with said recording medium comprises a cantilever with a proximal end fixed in position, the recording head being positioned at a distal end of said cantilever.

21. The apparatus of claim 20, wherein the cantilever is made of silicon or silicon nitride and has a spring constant ranging from 0.01 to 10 N/m and is covered with one or more surface coatings capable of conducting electricity.

22. The apparatus of claim 20, further comprising a movable base on which the recording medium is supported, the base being movable with respect to the recording head, and, a laser beam generator and a differentiating photodetector, the position of the recording medium with respect to the recording head being controlled by means of a laser beam generator and the differentiating photodetector, a laser beam generated by the laser beam generator being directed toward and reflected off from the distal end of the cantilever, the light reflected off from the distal end of the cantilever beam detected by the differentiating photodetector.

23. The apparatus of claim 20, wherein information is recorded by applying a pulse across the recording medium and proximal end of the cantilever.

24. The apparatus of claims 1, 10, 11, 12, wherein said means for recording the information in said recording medium while holding said recording head in contact with said recording medium comprises a cantilever with a proximal end fixed in position, the recording head being positioned at a distal end of said cantilever, the cantilever being made of silicon or silicon nitride and has a spring constant ranging from 0.01 to 10 N/m and being covered with one or more surface coatings capable of conducting electricity, the surface coatings being selected from the group consisting of Au, Pt, Co, Ni, Ir, Cr and conductive silicon.

25. The apparatus of claim 24, further comprising a movable base on which the recording medium is supported, the base being movable with respect to the recording head, and, a laser beam generator and a differentiating photodetector, the position of the recording medium with respect to the recording head being controlled by means of a laser beam generator and the differentiating photodetector, a laser beam generated by the laser beam generator being directed toward and reflected off from the distal end of the cantilever, the light reflected off from the distal end of the cantilever beam detected by the differentiating photodetector.

26. The apparatus of claim 24, wherein information is recorded by applying a pulse across the recording medium and proximal end of the cantilever.

\* \* \* \* \*